(12) United States Patent
Tsuchiya et al.

(10) Patent No.: US 10,511,744 B2
(45) Date of Patent: Dec. 17, 2019

(54) IMAGE PROCESSING APPARATUS AND METHOD THAT SUPPRESS DIFFERENCE IN COLORS PRINTED IN FORWARD AND BACKWARD SCANS, AND STORAGE MEDIUM

(71) Applicant: CANON KABUSHIKI KAISHA, Tokyo (JP)

(72) Inventors: Okinori Tsuchiya, Yokohama (JP); Tatsuhiro Yamagata, Inagi (JP); Yugo Mochizuki, Kawasaki (JP); Kouta Murasawa, Yokohama (JP); Toshiki Miyazaki, Tokyo (JP); Masao Kato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/965,122

(22) Filed: Apr. 27, 2018

(65) Prior Publication Data

US 2018/0332193 A1 Nov. 15, 2018

(30) Foreign Application Priority Data

May 12, 2017 (JP) .................................. 2017-095880

(51) Int. Cl.
| | | |
|---|---|---|
| *H04N 1/60* | (2006.01) | |
| *B41J 2/21* | (2006.01) | |
| *G06F 3/12* | (2006.01) | |
| *H04N 1/48* | (2006.01) | |

(Continued)

(52) U.S. Cl.
CPC .......... *H04N 1/6019* (2013.01); *B41J 2/2146* (2013.01); *B41J 19/147* (2013.01); *G06F 3/1204* (2013.01); *G06F 3/1206* (2013.01); *G06F 3/1248* (2013.01);

(Continued)

(58) Field of Classification Search
CPC ........ H04N 1/6019; H04N 1/58; H04N 1/486; B41J 19/147; B41J 2/2146; G06F 3/1248; G06F 3/1204; G06F 3/1206; G06F 3/1298

See application file for complete search history.

(56) References Cited

U.S. PATENT DOCUMENTS

| | | | | |
|---|---|---|---|---|
| 2004/0174403 A1* | 9/2004 | Yoshida | ................. | B41J 19/147 347/15 |
| 2015/0070426 A1* | 3/2015 | Nakamura | ............... | B41J 2/155 347/12 |
| 2016/0381249 A1* | 12/2016 | Eguchi | ................. | H04N 1/4092 358/2.1 |

FOREIGN PATENT DOCUMENTS

JP 4590211 B2 12/2010

* cited by examiner

*Primary Examiner* — Christopher Wait
(74) *Attorney, Agent, or Firm* — Venable LLP

(57) ABSTRACT

An image processing apparatus processes image data to be used in a printing apparatus configured to perform forward and backward scan printing by using a print head in which nozzle arrays corresponding to multiple colors are aligned. The image processing apparatus includes: a setting unit configured to set a first control parameter in a case where image data to be processed does not include a line portion and to set a second control parameter in a case where the image data to be processed includes a line portion, the second parameter being different from the first control parameter; and a processing unit configured to perform, for the image data to be processed, processing to suppress a difference between a color printed in a forward scan and a (Continued)

color printed in a backward scan based on the control parameter set by the setting unit.

20 Claims, 20 Drawing Sheets

(51) Int. Cl.
*B41J 19/14* (2006.01)
*H04N 1/58* (2006.01)
(52) U.S. Cl.
CPC ........... *G06F 3/1298* (2013.01); *H04N 1/486* (2013.01); *H04N 1/58* (2013.01)

| VECTOR RENDERING COMMAND | LINE RENDERING COMMAND | PEN RENDERING INITIALIZATION |
|---|---|---|
| | | PEN RENDERING RANGE SETTING |
| | | PEN DESIGNATION |
| | | PEN LINE WIDTH SETTING |
| | | PEN COLOR SETTING |
| | | PEN END SHAPE SETTING |
| | | MOVEMENT WITHOUT RENDERING |
| | | SINGLE STROKE RENDERING WITH COORDINATE MOVEMENT |
| | | PICK UP PEN |
| | | PAGINATION |
| | CHARACTER RENDERING COMMAND | CHARACTER FONT SETTING |
| | | CHARACTER SETTING |
| | HATCHING RENDERING COMMAND | HATCH PATTERN SETTING |
| | | HATCH DENSITY SETTING |
| BITMAP RENDERING COMMAND | BITMAP RENDERING COMMAND | RASTER RENDERING INITIALIZATION |
| | | COMPRESSION METHOD DESIGNATION |
| | | RASTER RENDERING RANGE SETTING |
| | | RASTER IMAGE DATA DESIGNATION |

FIG.4

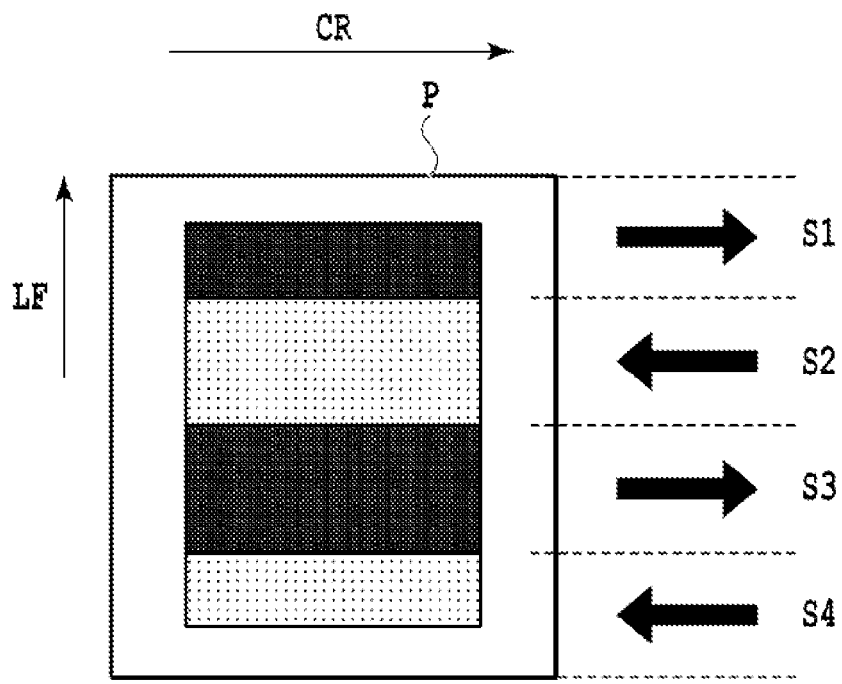
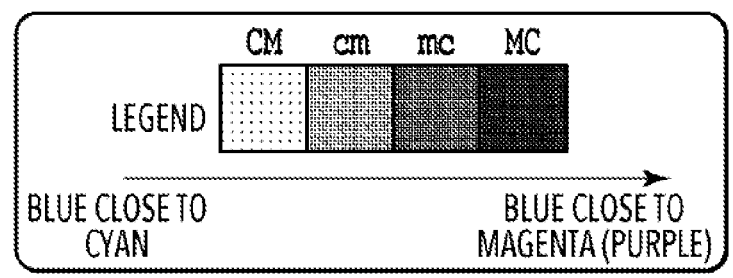
FIG.6

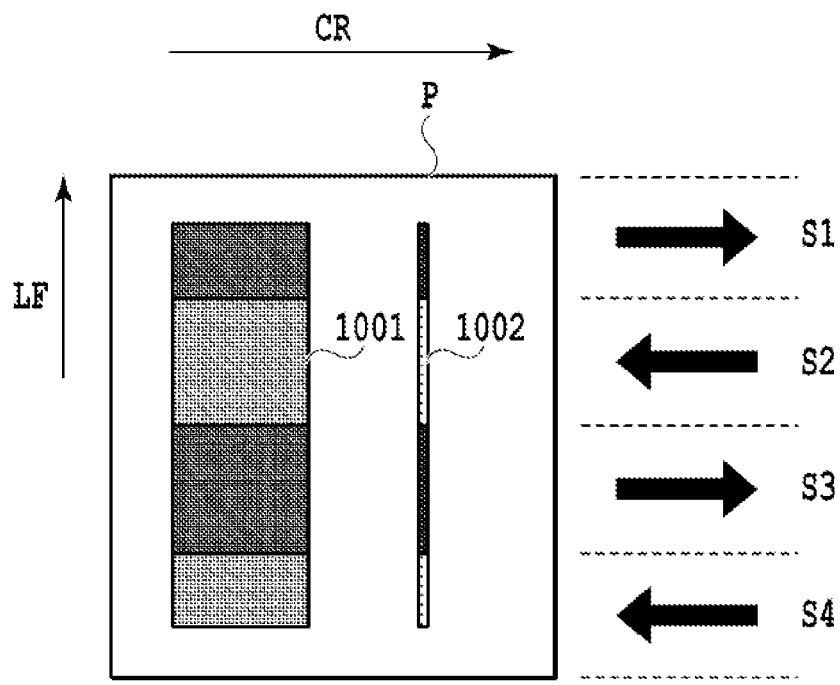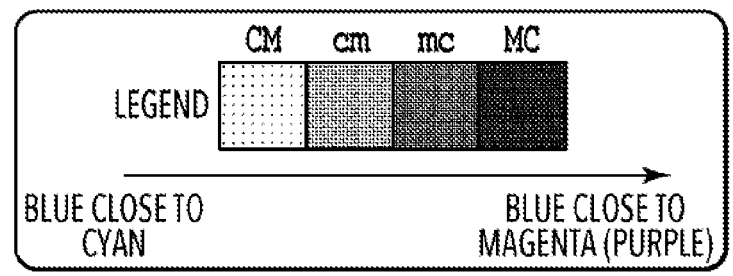
FIG.10

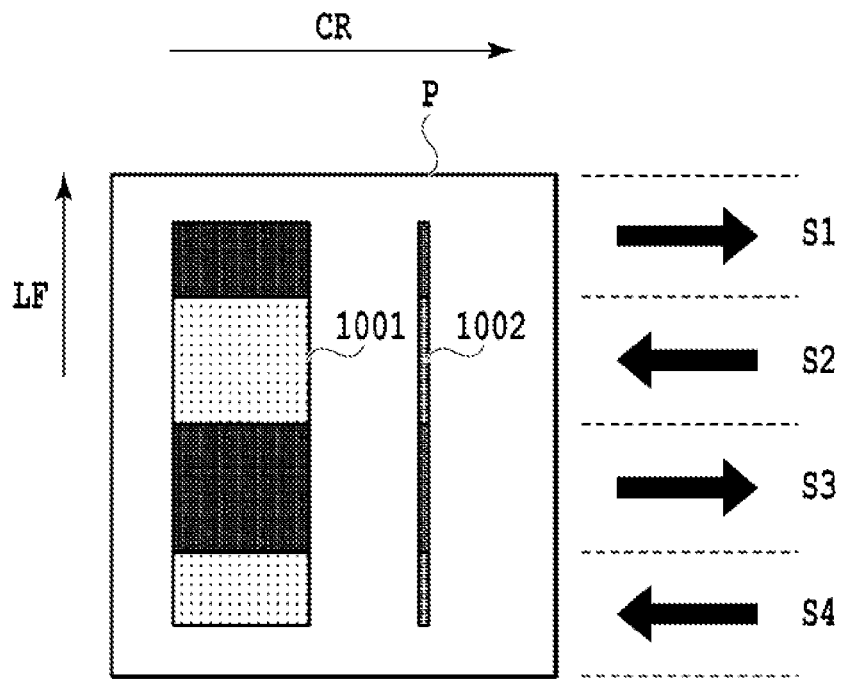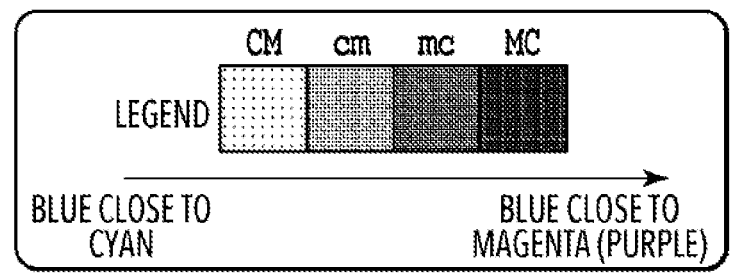
FIG.11

| INFORMATION OBTAINED FOR FINE LINE DETERMINATION | PDL | |
|---|---|---|
| IMAGE TYPE TO BE DETERMINED | LINE OR SOLID | |
| CONFIGURATION OF FORWARD AND BACKWARD COLOR UNEVENNESS CORRECTION | LINE PORTION | TABLE SET A |
| | SOLID PORTION | TABLE SET B |

FIG.15B

| INFORMATION OBTAINED FOR FINE LINE DETERMINATION | PDL | |
|---|---|---|
| IMAGE TYPE TO BE DETERMINED | LINE OR HATCH OR SOLID | |
| CONFIGURATION OF FORWARD AND BACKWARD COLOR UNEVENNESS CORRECTION | LINE PORTION | TABLE SET A |
| | HATCHED PORTION | TABLE SET C |
| | SOLID PORTION | TABLE SET B |

FIG.15C

| INFORMATION OBTAINED FOR FINE LINE DETERMINATION | PDL | |
|---|---|---|
| IMAGE TYPE TO BE DETERMINED | LINE AND LINE WIDTH | |
| CONFIGURATION OF FORWARD AND BACKWARD COLOR UNEVENNESS CORRECTION | 1-PIXEL WIDE LINE PORTION | TABLE SET A |
| | 2-PIXEL WIDE LINE PORTION | (TABLE SET A)×(16-2)/16 +(TABLE SET B)×2/16 |
| | ... | ... |
| | n-PIXEL WIDE LINE PORTION | (TABLE SET A)×(16-n)/16 +(TABLE SET B)×n/16 |
| | ... | ... |
| | 16-PIXEL OR MORE WIDE LINE OR SOLID PORTION | TABLE SET B |

FIG.15D

| INFORMATION OBTAINED FOR FINE LINE DETERMINATION | UI (PRINTING PURPOSE) | |
|---|---|---|
| IMAGE TYPE TO BE DETERMINED | LINE OR SOLID | |
| CONFIGURATION OF FORWARD AND BACKWARD COLOR UNEVENNESS CORRECTION | LINE PORTION | TABLE SET A |
| | SOLID PORTION | TABLE SET B |

FIG.15E

| INFORMATION OBTAINED FOR FINE LINE DETERMINATION | UI (PRINT MEDIUM) | |
|---|---|---|
| IMAGE TYPE TO BE DETERMINED | LINE OR SOLID | |
| CONFIGURATION OF FORWARD AND BACKWARD COLOR UNEVENNESS CORRECTION | LINE PORTION | TABLE SET A |
| | SOLID PORTION | TABLE SET B |

IMAGE PROCESSING APPARATUS AND METHOD THAT SUPPRESS DIFFERENCE IN COLORS PRINTED IN FORWARD AND BACKWARD SCANS, AND STORAGE MEDIUM

BACKGROUND OF THE INVENTION

Field of the Invention

The present invention relates to an image processing apparatus, an image processing method, and a storage medium.

Description of the Related Art

There is a serial type inkjet printer which performs printing while causing a print head, which is equipped with nozzle arrays corresponding to ink colors to be used, to scan a print medium in forward and backward directions crossing a conveyance direction of the print medium. There is also a printer which performs printing by ejecting ink in both of a forward scan and a backward scan in a case where a print head scans a print medium in forward and backward directions. In a printer which performs printing in both forward and backward scans, an overlap order of ink in the forward scan is different from that in the backward scan. Accordingly, a color printed in the forward scan is often different from a color printed in the backward scan.

Japanese Patent No. 4590211 (hereinafter referred to as Literature 1) discloses a technique to prepare a table for forward printing and a table for backward printing. In the case of a color difference more than a predetermined value, the table for forward printing is applied to forward scan printing and the table for backward printing is applied to backward scan printing to make color correction.

The use of the technique disclosed in Literature 1 can reduce the possibility of a color difference in the case of printing a solid image in forward and backward scans. However, for example, in the case of applying the same color correction to an image of a fine line or a tiny image, the image may be overcorrected and the color difference may be rather widened.

SUMMARY OF THE INVENTION

An image processing apparatus according to an aspect of the present invention is configured to process image data to be used in a printing apparatus configured to perform forward and backward scan printing by using a print head in which nozzle arrays corresponding to multiple colors are aligned, the image processing apparatus comprising: a setting unit configured to set a first control parameter in a case where image data to be processed does not include a line portion and to set a second control parameter in a case where the image data to be processed includes a line portion, the second control parameter being different from the first control parameter; and a processing unit configured to perform, for the image data to be processed, processing to suppress a difference between a color printed in a forward scan and a color printed in a backward scan based on the control parameter set by the setting unit.

Further features of the present invention will become apparent from the following description of exemplary embodiments with reference to the attached drawings.

BRIEF DESCRIPTION OF THE DRAWINGS

FIG. 4 is a table showing the contents of the rendering commands;

FIG. 6 is a diagram showing an example of scans by the print head;

FIG. 10 is a diagram showing the application of color unevenness correction processing;

FIG. 11 is a diagram showing a variation in a color difference caused by forward and backward scan printing;

FIG. 12A to FIG. 12I are diagrams showing gradations in a solid portion and a fine-line portion;

FIG. 15A to FIG. 15E are tables showing the switching of table sets;

DESCRIPTION OF THE EMBODIMENTS

Figure 1:
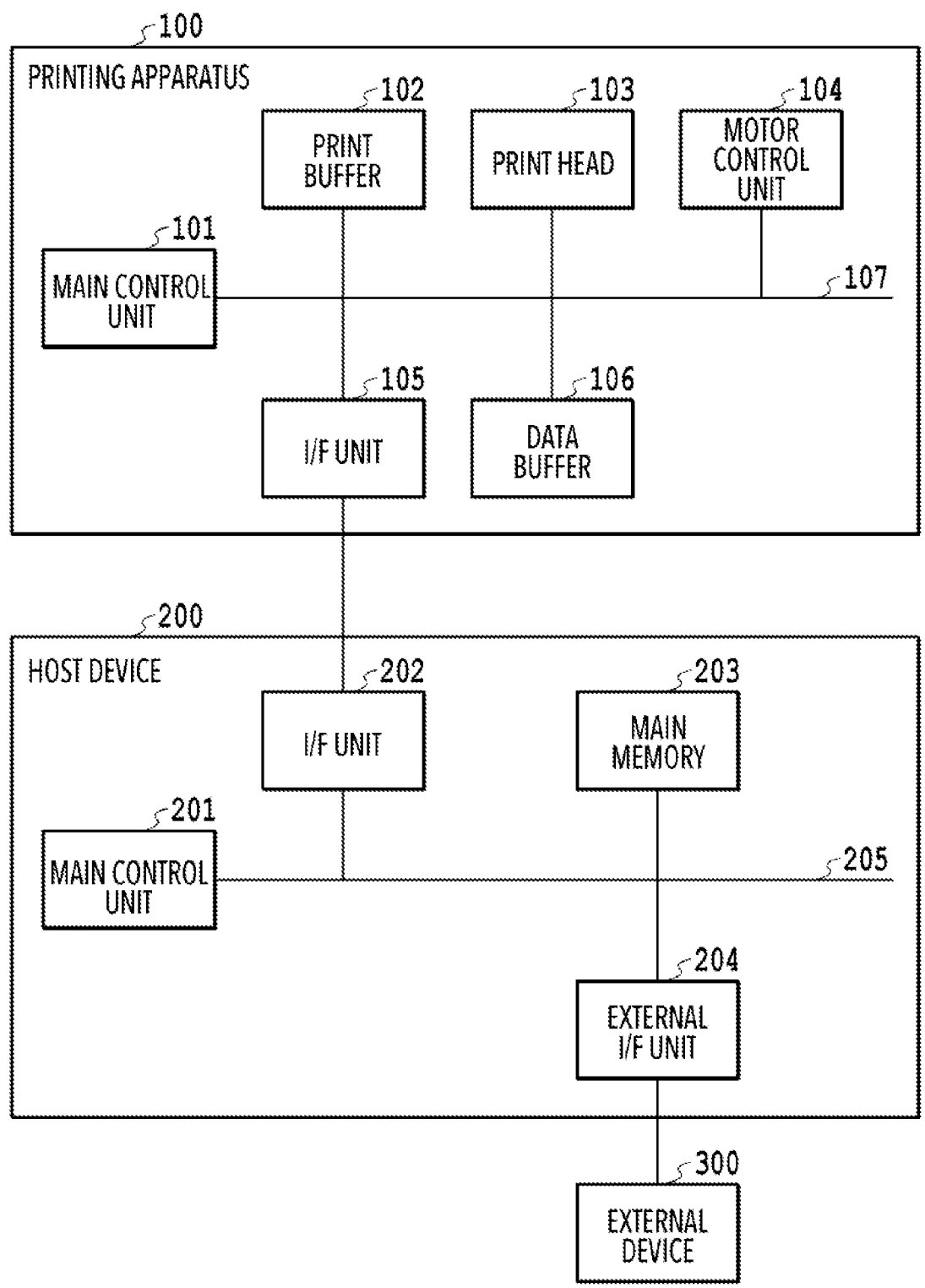
FIG. 1 is a block diagram showing a schematic configuration of a printing system.

Preferred embodiments of the present invention will be described in detail as examples with reference to the accompanying drawings. It should be noted that the constituent elements described in the following embodiments are just examples and the scope of the present invention is not limited to them.

Definition of Terms

The terms used in this specification are defined as below in advance.

"Print" broadly means forming an image, design, pattern or the like on a print medium or processing a print medium. The term is used not only in the case of forming significant information such as a character or graphic. An object to be printed may be either significant or insignificant and is irrespective of whether it is apparent to the human eye.

"Print medium" means any medium capable of receiving ink such as a cloth, plastic film, metal plate, glass, ceramic, wood, or leather, as well as paper used in general printing apparatuses.

"Ink" (or "liquid") should be broadly interpreted, in the same way as the definition of "print," as a liquid that can be applied to a print medium to form an image, design, pattern or the like or to process the print medium. The term also covers a liquid that can be used for ink treatment (such as coagulation or insolubilization of a coloring material in ink to be applied to a print medium).

"Nozzle" collectively means an ejection opening, a liquid path communicating with the ejection opening, and an element that generates energy used for ink ejection, unless otherwise specified.

"Scan" means the movement of a print head on a print medium to perform printing for the print medium. The movement of a head during increase or decrease in speed for printing or related to printing is referred to as a scan.

"Forward and backward scan printing" means performing printing in each of a forward scan and a backward scan in the case of scanning a print medium in both the forward and backward directions. It is also referred to as bidirectional printing.

"Color difference" means a difference in color and is also referred to as a gross difference or bronze difference. In this specification, a color difference is denoted by $\Delta E$. It should be noted that $\Delta E$ in the CIE 1976 space is described as an example in this specification. In the CIE–L*a*b* space, a color difference $\Delta E$ between two measurement values (L1*, a1*, b1*) and (L2*, a2*, b2*) is defined as follows:

$$\Delta E = \{(\Delta L^*)^2 + (\Delta a^*)^2 + (\Delta b^*)^2\}^{(1/2)},$$

where $\Delta L^* = L1^* - L2^*$, $\Delta a^* = a1^* - a2^*$, and $\Delta b^* = b1^* - b2^*$.

"Color gamut" means a range of colors that can be reproduced in an arbitrary color space. A color gamut volume is an index of the size of the color gamut. The color gamut volume is a three-dimensional volume in an arbitrary color space. Chromaticity points that form a color gamut are often discrete. In this case, for example, a specific color gamut is represented by 729 points in the CIE–L*a*b* space and points between them can be calculated according to a well-known interpolation method such as tetrahedral interpolation or cubic interpolation. In this specification, although a color gamut is not limited to a specific color space, a color gamut in the CIE–L*a*b* space is described as an example.

Embodiment 1

<<Schematic Block Diagram>>

FIG. 1 is a schematic block diagram showing an example of a control configuration of a printing system according to the present embodiment. The printing system of the present embodiment has an inkjet printing apparatus (hereinafter referred to as "printing apparatus 100") and a host device 200 which is connected to the printing apparatus 100 and transmits data to be printed. For example, an external device 300 such as a digital camera can be connected to the host device 200.

The host device 200 transmits control data and print data to the printing apparatus 100. The host device 200 is an information processing apparatus such as a PC. The host device 200 has a main control unit 201 which includes a CPU, ROM, RAM and the like and controls image data generation and major operations. The host device 200 also has an interface (I/F) unit 202 which communicates with the printing apparatus 100, a main memory 203, and an external I/F unit 204 which communicates with the external device 300 connected to the host device 200. The host device 200 further has a system bus 205 which connects the main control unit 201 to each unit.

Various standards can be used for an interface between the printing apparatus 100 and the host device 200 and an interface between the host device 200 and the external device 300 regardless of whether wired or wireless. Representative standards are Centronics interface, USB, IEEE1394, IrDA, Bluetooth (registered trademark), and various wired and wireless LAN standards. A suitable one is selected as appropriate based on a use form and configuration of an apparatus.

Image data input from the external device 300 or the like to the host device 200 and image data generated by an application of the host device 200 are stored in the main memory 203. In a case where an instruction to print image data is issued in the application of the host device 200, a printer driver is activated. The main control unit 201 performs predetermined processing for image data stored in the main memory 203 based on settings, thereby generating image data to be transmitted to a printer (hereinafter "printer transmission image data"). The host device 200 transmits the generated printer transmission image data to the printing apparatus 100.

Next, the configuration of the printing apparatus 100 is described. The printing apparatus 100 has a main control unit 101 which includes an MPU, ROM, RAM and the like. The main control unit 101 controls the entire printing apparatus 100 and performs image processing. The main control unit 101 functions as an image processing unit. The printing apparatus 100 also has a print buffer 102 and a print head 103. The print buffer 102 stores print data in a raster format before the print data is transferred to the print head 103. The print head 103 selectively ejects ink based on the print data stored in the print buffer 102. Further, the printing apparatus 100 has a motor control unit 104 which controls motors for driving a carriage and feeding and discharging a print medium and an interface (I/F) unit 105 which communicates with the host device 200. Moreover, the printing apparatus 100 has a data buffer 106 which temporarily stores print data received from the host device 200 and stores image processing parameters such as various conversion tables and dither patterns and intermediate image data generated as intermediate data. The various conversion tables include a color correction table (preprocessing table) and a color separation table (postprocessing table) necessary for image processing in the main control unit 101, which will be described later in detail. As a data buffer, various memory apparatuses such as a RAM and HDD can be used. The printing apparatus 100 further has a system bus 107 which connects the main control unit 101 to each unit.

The printer transmission image data to be transmitted from the host device 200 to the printing apparatus 100 is additive color data using the three primary colors RGB suitable for display on a display unit such as a liquid crystal display screen and CRT. In contrast, the print head 103 of the printing apparatus 100 finally performs printing by using a subtractive color system including ink of the three primary colors CMY. Accordingly, the main control unit 101 (image processing unit) of the printing apparatus 100 performs predetermined image processing including color conversion processing to convert RGB image data into print data corresponding to ink of the three primary colors CMY used in a printer. For example, the image processing includes color conversion processing (also referred to as postprocessing) to convert image data represented by RGB into data (also referred to as color separation data) corresponding to the types of ink to be used and dithering processing to quantize the color separation data obtained in the postprocessing. The print data is generated by repeating the data conversion processing for a predetermined unit of data. More specifically, a desired conversion table (for example, a conversion table used for the postprocessing) is read from the data buffer 106 to a buffer memory of the main control unit 101. Then, image data is read from the data buffer 106, for example, in a unit of size that can be printed by one scan (i.e. one band). After that, the data conversion processing is repeated.

In the case of changing (switching) a conversion table used for the postprocessing, processing to access the data buffer 106 and read a conversion table is performed. That is, in the case of switching a conversion table between the forward and backward directions, the processing to access the data buffer 106 and read a conversion table is performed for each path.

<Flow of Image Processing>

Figure 2:
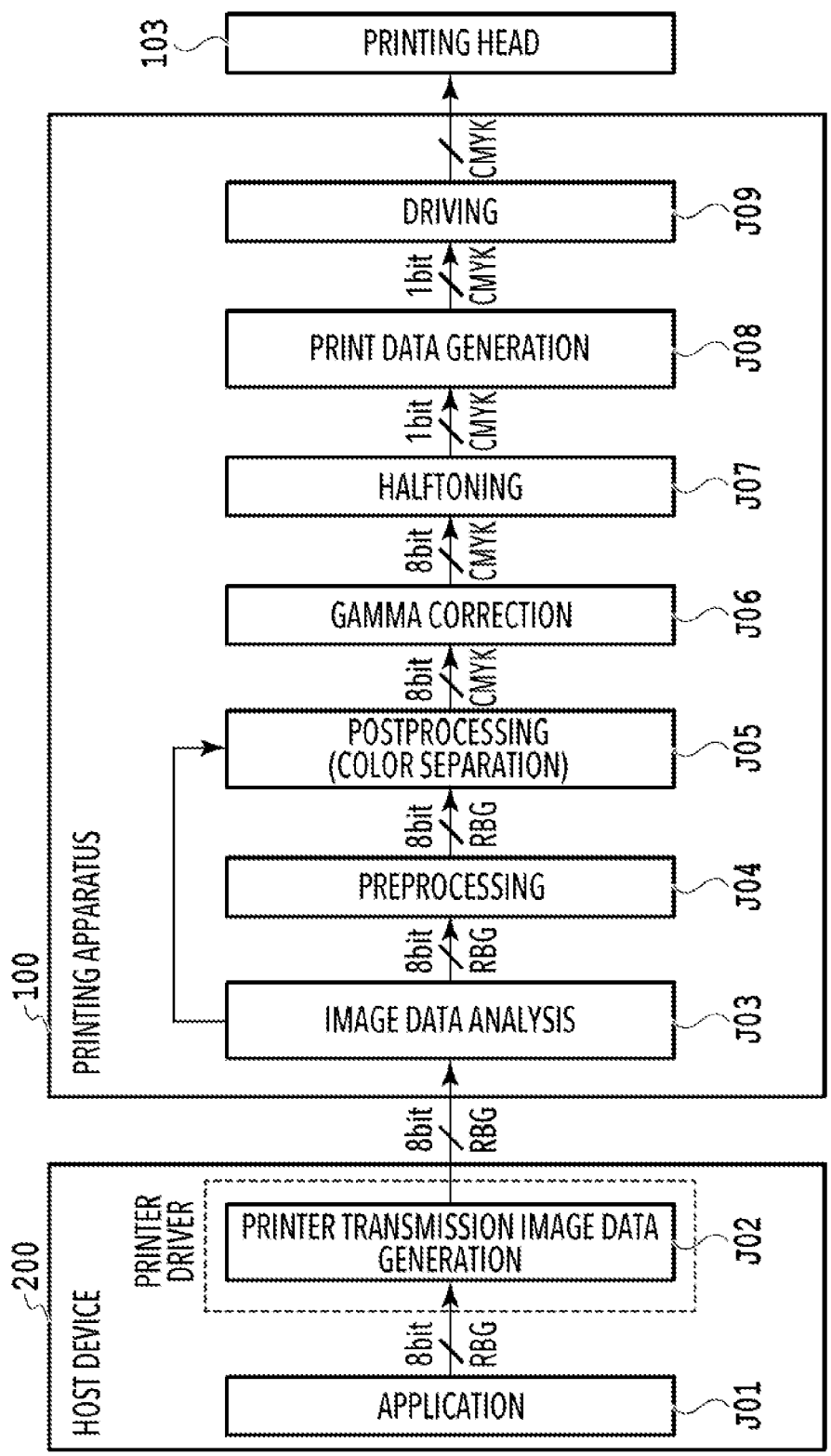
FIG. 2 is a diagram showing a flow of image data conversion processing.

FIG. 2 is a block diagram showing a flow of the image data conversion processing in the printing system of the present embodiment. The printing apparatus 100 of the present embodiment performs printing by using four ink colors: cyan, magenta, yellow, and black. The print head 103 has nozzle arrays which eject ink of the four colors. As shown in FIG. 2, it is assumed that the image processing in the printing system is performed by a personal computer (PC) serving as the host device 200 and the printing apparatus 100.

Programs that run on the operating system of the host device 200 include an application and a printer driver. In application processing J01, the application performs processing to generate image data corresponding to an image to be printed by the printing apparatus 100. The image data generated in the application processing J01 is passed to the printer driver.

As the image data, the printer driver of the host device 200 generates image data in a page description language (PDL) format. The image data in the PDL format is hereinafter referred to as PDL data. For example, "PDF" and "PostScript" of Adobe Systems Incorporated and "HPGL/2" of Hewlett-Packard Company are known as PDL. PDL is a widely-used image format capable of describing not only bitmap images but also vector graphics such as lines and characters. The printer driver performs printer transmission image data generation processing J02 to generate printer transmission image data based on the image data passed from the application. The printer transmission image data is PDL data. The printer driver generates the printer transmission image data by adding a header part such as print setting information set via a user interface (UI) of the host device 200. The generated printer transmission image data is transmitted from the I/F unit 202 of the host device 200 to the printing apparatus 100 via the I/F unit 105 of the printing apparatus 100 and stored in the data buffer 106.

[PDL Format and Rendering of PDL Data Into Raster Image Data]

Figure 3A:
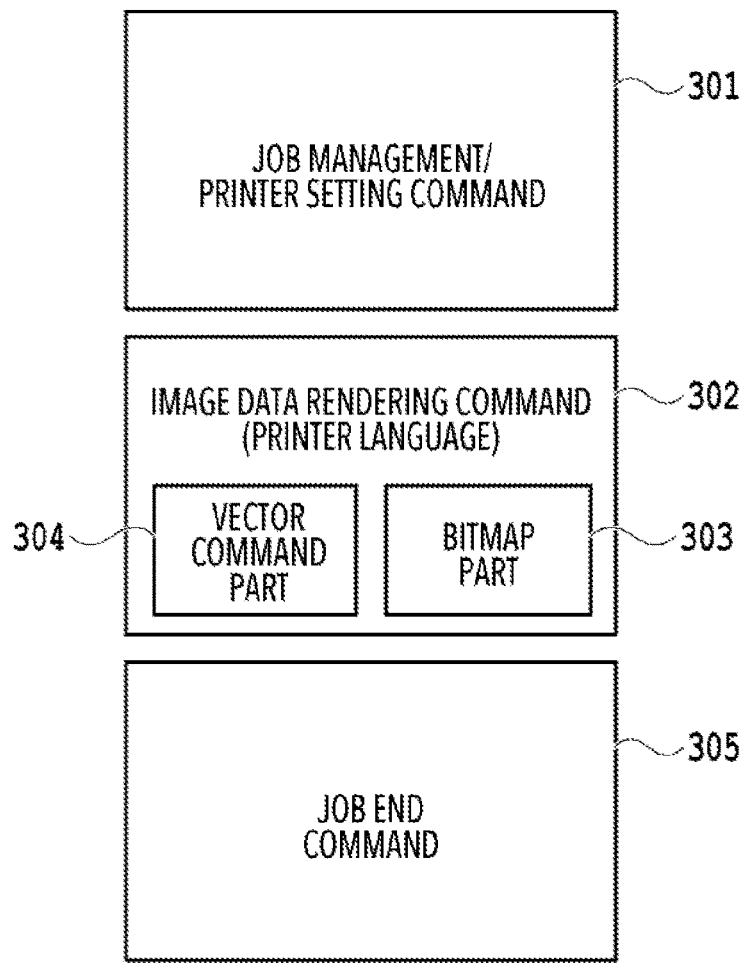
FIG. 3A and FIG. 3B are diagrams showing a PDL format and rendering commands.
Figure 3B:
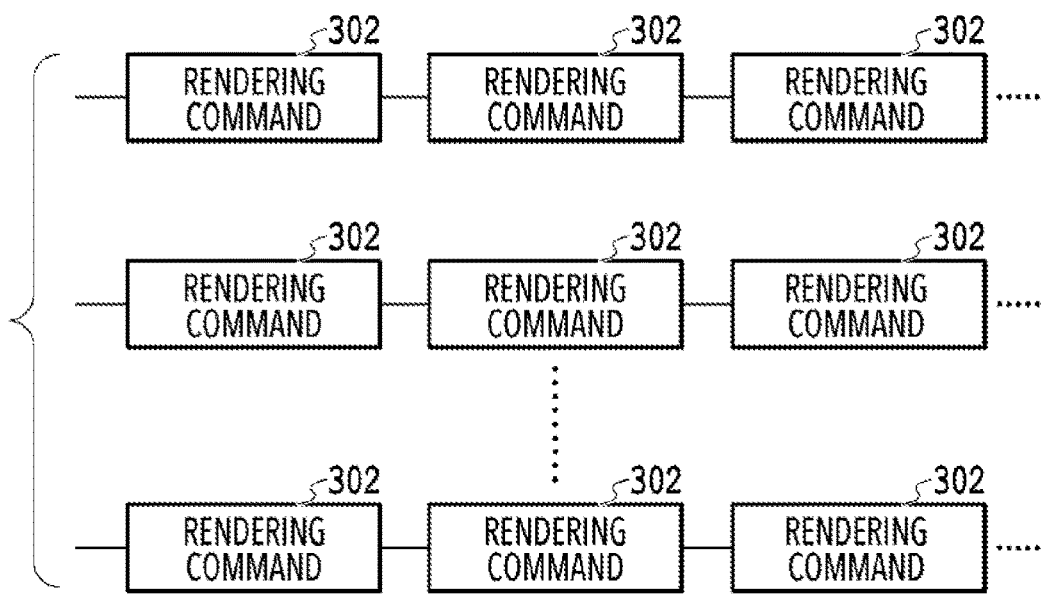

FIG. 3A is a diagram showing an example of the PDL format. The PDL format includes a job management/printer setting command 301, an image data rendering command 302, and a job end command 305. The image data rendering command 302 includes a vector command part 304 in addition to a bitmap part 303 so as to represent graphics such as characters and lines as well as bitmap images. FIG. 3B is a diagram showing the image data rendering command 302. The image data rendering command 302 includes series of rendering commands 302 in certain units (64 KB in this case) called a display list (DL).

FIG. 4 is a command list showing the contents of the rendering commands 302. FIG. 4 shows that the rendering commands 302 are broadly divided into bitmap rendering commands and vector rendering commands. The vector rendering commands are further broadly divided into "line rendering command" related to a pen color, line width, rendering and the like, "character rendering command" specifying a character font and a character per se, and "hatching rendering command" specifying a hatch pattern and density. "Hatch" means a cross-hatching or linear hatching process for an area. Hatch patterns selectable here include vertical hatch, horizontal hatch, right up diagonal hatch, left up diagonal hatch, cross-hatch using vertical and horizontal lines, and cross-hatch using diagonal lines. Specifying the hatch density enables the settings of the width of lines and the width of spaces between the lines.

Image data in such a PDL format is transmitted from the host device 200 to the printing apparatus 100.

The main control unit 101 (image processing unit) of the printing apparatus 100 performs image data analysis processing J03. In the image data analysis processing J03, the image data in the PDL format is sequentially read from the data buffer 106. The main control unit 101 (image processing unit) then analyzes rendering commands included in the PDL data and renders the image data in the PDL format (PDL data) into raster image data in a format equivalent to bitmap. Then, the rendered raster image data is stored in the data buffer 106.

The analyzed and rendered raster image data is further subjected to image processing in the main control unit 101 (image processing unit).

The main control unit 101 (image processing unit) performs preprocessing J04, postprocessing J05, gamma correction processing J06, halftoning processing J07 as binarization, and print data generation processing J08. The processing is briefly described below. In the preprocessing J04, color gamut mapping is performed. For example, in the case of sRGB image data, data conversion is performed to map a color gamut reproduced by the sRGB image data to a device-dependent color gamut reproduced by the printing apparatus 100. To be more specific, a three-dimensional lookup table (3DLUT) is referred to and data representing each of R, G, and B using 8 bits is converted into 8-bit data R, G, and B depending on a color gamut that can be represented by the printing apparatus 100.

In the postprocessing J05, color separation processing is performed to convert the 8-bit data R, G, and B obtained in the preprocessing J04 into color separation data (8-bit data C, M, Y, and K in this case) corresponding to ink combinations for reproducing colors represented by the RGB data. More specifically, the postprocessing J05 uses a conversion table (such as a three-dimensional lookup table [LUT]) which associates RGB data with CMYK data corresponding to ink colors one by one. RGB data is converted into CMYK data with reference to the conversion table. For example, in the three-dimensional LUT, R, G, and B values each represented by 8 bits (0 to 255) are associated in advance with C, M, Y, and K values each represented by 8 bits (0 to 255). Then, (R, G, B)=(0 to 255, 0 to 255, 0 to 255) is converted into (C, M, Y, K)=(0 to 255, 0 to 255, 0 to 255, 0 to 255).

For example, (R, G, B)=(0, 0, 0) is converted into (C, M, Y, K)=(0, 0, 0, 255).

(R, G, B)=(255, 255, 255) is converted into (C, M, Y, K)=(0, 0, 0, 0).

(R, G, B)=(0, 128, 0) is converted into (C, M, Y, K)=(128, 0, 128, 0).

In the present embodiment, at least two types of such conversion tables (three-dimensional LUTs) are prepared and a conversion table to be used is switched according to a predetermined condition. This will be described later in detail.

In the gamma correction processing J06, gradation value conversion is performed for data on each ink color included in the color separation data obtained in the postprocessing J05. More specifically, the printing apparatus 100 performs conversion to linearly associate the color separation data with the gradation characteristics of the printing apparatus 100 by the use of a one-dimensional LUT corresponding to the gradation characteristics of each ink color.

In the halftoning processing J07, quantization processing is performed to convert each of 8-bit color separation data C, M, Y, and K into 1-bit data. In the present embodiment, binary dithering is used to convert 8-bit data of 256 levels into 1-bit data of two levels. In the print data generation processing J08, print data is generated by adding print control information to print image data which is 1-bit dot data. The generated print data is stored in the print buffer 102. The binary print data stored in the print buffer 102 is sequentially read by the main control unit 101, input to a head driving circuit, and subjected to driving processing J09. In the driving processing J09, 1-bit data on each color input to the head driving circuit is converted into a driving pulse of the print head 103 and ink is ejected at a predetermined timing.

<Configuration of Print Head>

Figure 5:
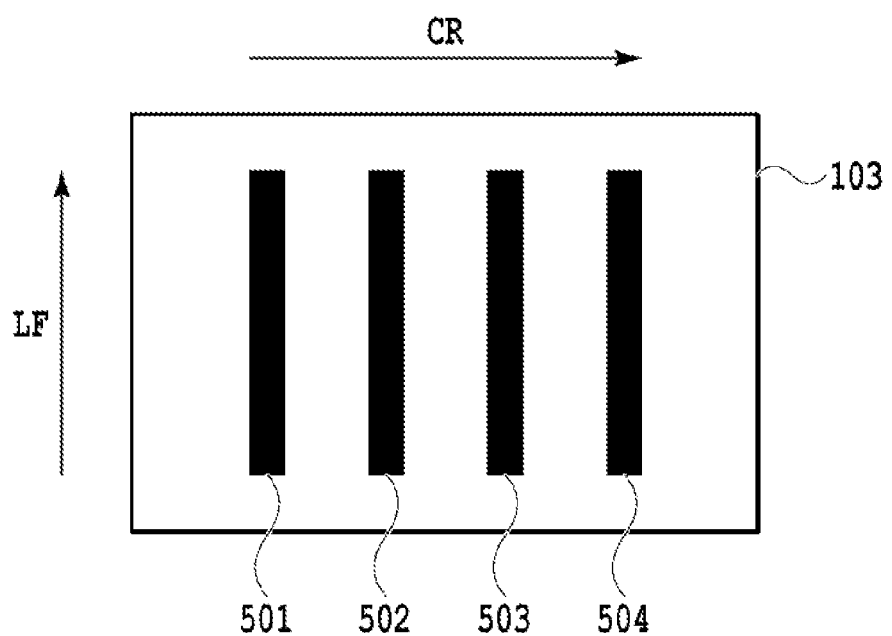
FIG. 5 is a diagram schematically showing the arrangement of nozzle arrays corresponding to respective colors in a print head.

FIG. 5 is a diagram schematically showing the arrangement of nozzle arrays corresponding to respective colors in the print head 103 used in the printing apparatus 100 of the present embodiment. FIG. 5 shows the arrangement of the nozzle arrays in the case of seeing the print head 103 from the bottom (the side on which the nozzle arrays are provided). Each of nozzle arrays 501 to 504 shown in FIG. 5 indicates a nozzle array that ejects ink. A nozzle array 501 ejects cyan ink, a nozzle array 502 ejects magenta ink, a nozzle array 503 ejects yellow ink, and a nozzle array 504 ejects black ink. Since nozzle arrays are horizontally aligned, a print head having such a nozzle configuration may be referred to as a horizontally-aligned head. In the configuration illustrated, the nozzle arrays each include the same number of nozzles, for example, 256 nozzles. In FIG. 5, arrow LF indicates a conveyance direction of a print medium and arrow CR indicates a direction of a scan (forward scan) by the print head.

The arrangement of the nozzle arrays of the print head 103 is not limited to the example shown in FIG. 5 but may take various forms. For example, a print head having a different arrangement order or a different number of nozzles included in each array may be used. Further, although the nozzle arrays of the respective colors are formed together on one chip in the head shown in FIG. 5, the nozzle arrays of the respective colors may be formed separately on different chips. Alternatively, out of the nozzle arrays of four colors (CMYK), one nozzle array (for example, K) may be formed on a chip different from a chip on which the rest of the nozzle arrays (for example, CMY) are formed.

<Color Difference Between Forward Scan Printing and Backward Scan Printing in Solid Portion>

Next, a color difference that occurs in the case of forward and backward scan printing using the print head 103 as shown in FIG. 5 is described. As described above, "forward and backward scan printing" means performing printing in each of a forward scan and a backward scan.

[Overview]

FIG. 6 is a diagram showing an example of scans by the print head 103 in the case of performing printing for one print medium. In FIG. 6, a print medium P is conveyed in the direction indicated by arrow LF and subjected to printing from the front end in four scans (also referred to as paths) indicated by scan S1, scan S2, scan S3, and scan S4. S1 and S3 each represent forward scan printing, that is, printing performed while the print head 103 moves in the direction shown by arrow CR (from left to right in FIG. 6). S2 and S4 each represent backward scan printing, that is, printing performed while the print head 103 moves in the direction opposite to the direction shown by arrow CR (from right to left in FIG. 6).

In the case of performing the forward and backward scan printing described above by the use of the print head 103 having the nozzle arrays as shown in FIG. 5, ink droplets are ejected in the order of black, yellow, magenta, and cyan in the forward scan printing S1 and S3. In the backward scan printing S2 and S4, ink droplets are ejected in the order of cyan, magenta, yellow, and black. As a result, the order of ink ejected to the print medium P differs according to the scan direction. Consequently, pixels represented by multiple ink colors have different colors even if each ink is ejected in the same amount. If this difference in color (color difference) becomes large, it is recognized as color unevenness.

FIG. 6 shows that in image areas of a solid portion having the same color value represented by cyan and magenta, image areas printed in the forward scans are different in color from image areas printed in the backward scans. More specifically, the image areas printed in the forward scans are blue close to magenta and the image areas printed in the backward scans are blue close to cyan. In the legend of FIG. 6, "CM (or cm)" denotes a color reproduced by ejecting magenta ink after ejecting cyan ink and "MC (or mc)" denotes a color reproduced by ejecting cyan ink after ejecting magenta ink. CM indicates blue close to cyan and cm, mc, and MC indicate blue colors that gradually become close to magenta in this order. Regarding the ink used in the present embodiment, $\Delta E$ between CM and MC is about 15 and $\Delta E$ between cm and mc is about 6. A mechanism of occurrence of a color difference between forward scan printing and backward scan printing is described below.

[Mechanism of Occurrence of Color Difference Between Forward Scan Printing and Backward Scan Printing]

Figure 7:
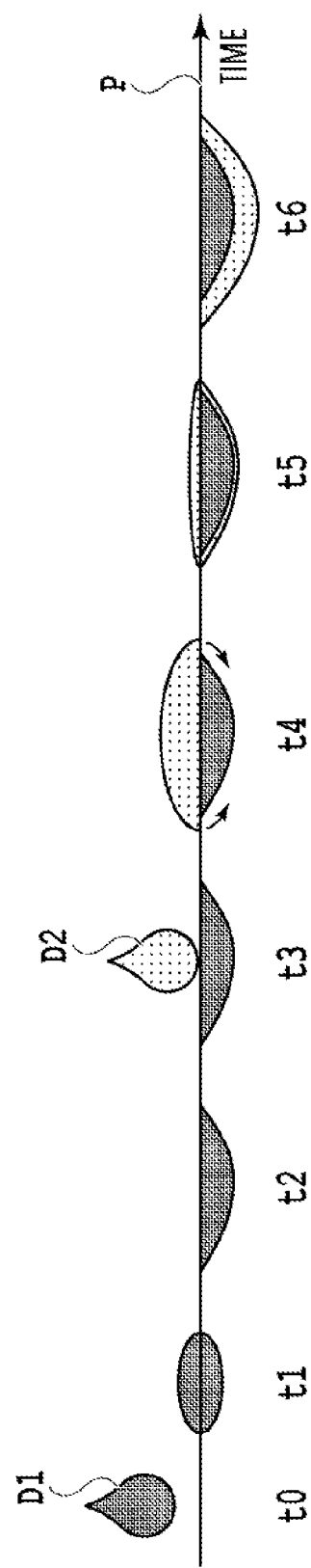
FIG. 7 is a diagram showing a mechanism of occurrence of a color difference between forward scan printing and backward scan printing.

FIG. 7 is a diagram showing a mechanism of occurrence of a color difference between forward scan printing and backward scan printing. FIG. 7 shows a temporal change in permeation and fixing of ink ejected previously (hereinafter "previous ink") and ink ejected after the previous ink (hereinafter "subsequent ink") in the case of using permeation ink. FIG. 7 is a diagram shown in the cross-sectional direction of the print medium P. In this example, the previous ink is magenta and the subsequent ink is cyan. That is, the example corresponds to the printing in the forward scans shown in FIG. 6.

In FIG. 7, previous magenta ink D1 to be previously ejected is ejected at time t0. At time t1, the magenta ink lands on the surface of the print medium P and starts permeating into pores in the print medium P. At time t2, the permeation of the previous magenta ink D1 into the print medium P is completed. At time t3, subsequent cyan ink D2 to be subsequently ejected lands on the area permeated with the previous magenta ink D1. At time t4, the subsequent cyan ink D2 tries to start permeating. However, moisture contained in the previous magenta ink D1 occupies pores near the surface of the print medium P, which inhibits the subsequent cyan ink D2 from permeating. Accordingly, the subsequent cyan ink D2 permeates into the print medium P around the periphery of the area permeated with the previous magenta ink D1. At time t5, the subsequent cyan ink D2 continues permeating around the pores in the print medium P occupied by the previous magenta ink D1. At time t6, the permeation of the subsequent cyan ink D2 is completed.

As a result, the previous magenta ink D1 occupies the proximity of the surface of the print medium P and the subsequent cyan ink D2 permeates deep into the surface of the print medium P or around the periphery of the landing position and is then fixed. Since an ink color closer to the surface of the print medium P has a greater influence on a resulting color, a dot of blue close to magenta is formed in the case of fixing state at time t6.

FIG. 7 shows the printing in the forward scan as an example, but in the case of the backward scan, the previous ink is cyan and the subsequent ink is magenta. It should be noted that it depends on a printing method as to which of a previously-printed color and a subsequently-printed color becomes predominant. For example, in the case of transfer printing, the order described above is inversed. However, also in this case, a color difference similarly occurs between an area printed in a forward scan and an area printed in a backward scan.

Figure 8A:
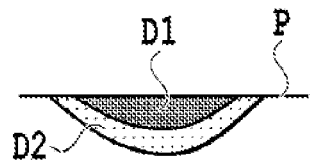
FIG. 8A to FIG. 8F are diagrams showing the states of a print medium in the case of changing the order of ink ejection.
Figure 8B:
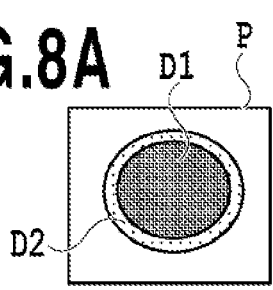
Figure 8C:
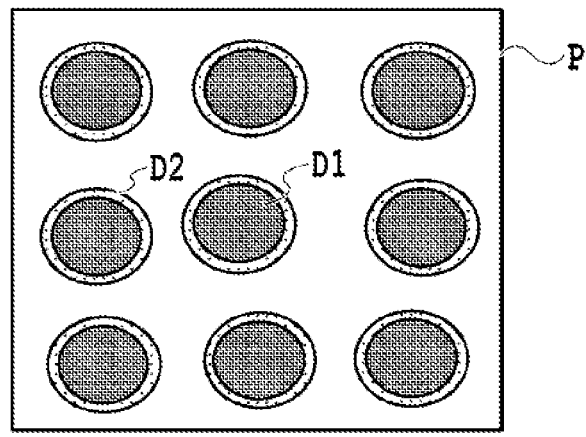

FIG. 8A to FIG. 8F are diagrams showing the states of the print medium P in the case of changing the order of ejection of cyan ink and magenta ink (ejection order). FIG. 8A shows a state of fixing previous magenta ink D1 and subsequent cyan ink D2 into the surface of the print medium P, that is, shows the same fixing state as that shown in FIG. 7. The previous magenta ink D1 is fixed near the surface and the subsequent cyan ink D2 is fixed deep in the surface of the print medium P, thereby forming a dot of blue close to magenta. FIG. 8B shows this fixing state from the top of the print medium P. The subsequent cyan ink D2 has spread around the dot of blue close to magenta. Such dots are gathered to form an area of blue close to magenta as shown in FIG. 8C.

Figure 8D:
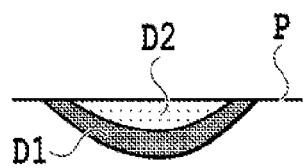
Figure 8E:
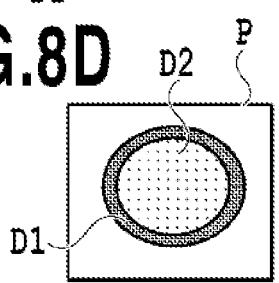
Figure 8F:
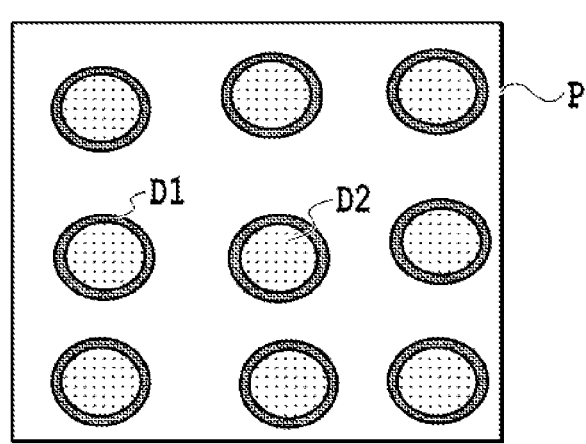

FIG. 8D shows a state of fixing previous cyan ink D2 and subsequent magenta ink D1 into the surface of the print medium P. The previous cyan ink D2 is fixed near the surface and the subsequent magenta ink D1 is fixed deep in the surface of the print medium P, thereby forming a dot of blue close to cyan. FIG. 8E shows this fixing state from the top of the print medium P. The subsequent magenta ink D1 has spread around the dot of blue close to cyan. Such dots are gathered to form an area of blue close to cyan as shown in FIG. 8F.

As described above, in the case of forward and backward scan printing, a color difference is caused by a difference in ink ejection order. Consequently, a color gamut that can be reproduced in forward scan printing is different from that in backward scan printing. The color gamuts are described below.

[Color Gamuts in Forward and Backward Scan Printing]

Figure 9:
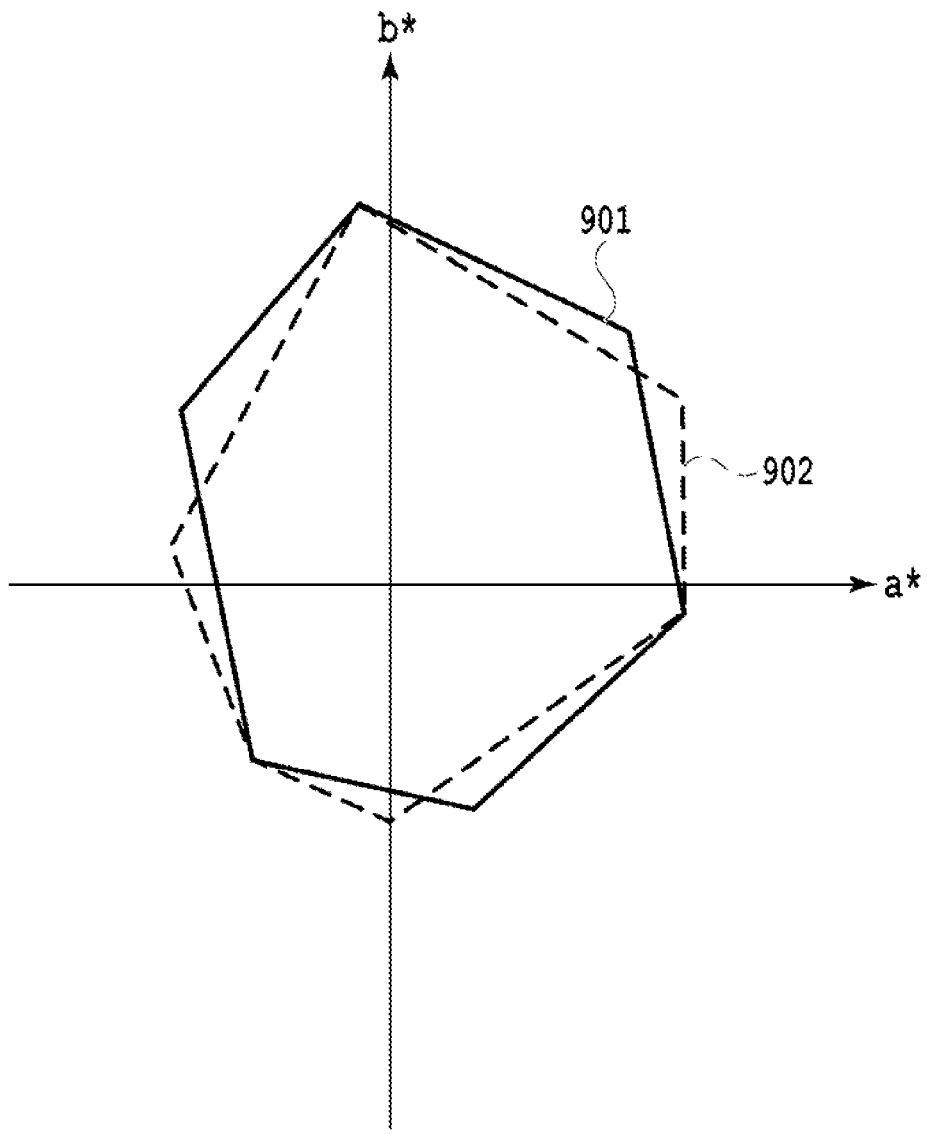
FIG. 9 is a diagram showing color gamuts.

FIG. 9 is a diagram showing color gamuts in forward scan printing and backward scan printing, respectively. FIG. 9 shows the color gamuts in the CIE–L*a*b* space projected on an ab plane. In FIG. 9, area 901 indicates a color gamut that can be reproduced by printing in a forward scan and area 902 indicates a color gamut that can be reproduced by printing in a backward scan. As is obvious from FIG. 9, a color gamut differs according to the scan direction. This difference in color gamut is caused by a difference in the overlap order of ink between the forward and backward directions.

[Conventional Means]

In order to reduce such a color difference (color unevenness) between forward scan printing and backward scan printing, a table for forward scan printing and a table for backward scan printing have been prepared as described above. In this case, processing is performed to determine whether a pixel group (band) to be subjected to conversion processing should be printed in a forward scan or a backward scan and to switch a conversion table to be used based on the result of the determination. The conversion table is one of three-dimensional LUTs used in the postprocessing J05. That is, data to be printed in a forward scan is subjected to the postprocessing J05 (color separation processing) by the use of a three-dimensional LUT for forward scan printing. Data to be printed in a backward scan is subjected to the postprocessing J05 (color separation processing) by the use of a three-dimensional LUT for backward scan printing. This configuration can reduce a color difference (color unevenness) in a solid portion as shown in FIG. 6.

[Color Difference Between Forward Scan Printing and Backward Scan Printing in Fine-Line Portion]

In a case where the technique to correct a color difference (color unevenness) between forward scan printing and backward scan printing is applied to an image including both a fine-line portion and a solid portion, color unevenness caused by the forward and backward scan printing is corrected in the solid portion but the fine-line portion may be overcorrected and this may rather cause color unevenness. This is described below in detail.

FIG. 10 is a diagram showing a result of applying the correction processing of color unevenness between forward scan printing and backward scan printing described above to an image including both a solid portion 1001 and a fine-line portion 1002. In the solid portion 1001, a color printed in a forward scan S1 is mc, which is blue slightly close to magenta. Similarly, in the solid portion 1001, a color printed in a backward scan S2 is cm, which is blue slightly close to cyan. In short, a color difference between forward printing and backward printing is reduced in the solid portion 1001.

On the other hand, in the fine-line portion 1002, a color printed in the forward scan S1 is MC, which is blue fairly close to magenta. Similarly, in the fine-line portion 1002, a color printed in the backward scan S2 is CM, which is blue fairly close to cyan. That is, a color difference between forward and backward printing is increased in the fine-line portion 1002.

[Factors of Variation in "Color Difference Between Forward Scan Printing and Backward Scan Printing" Between Fine-line Portion and Solid Portion]

Factors of a variation in a "color difference between forward and back scans" between a fine-line portion and a solid portion are described below.

[Overview]

FIG. 11 is a diagram showing a variation in a color difference caused by forward and backward scan printing between a solid portion 1001 having a size greater than a minimum unit of area of area coverage modulation and a fine-line portion 1002 having a width less than the minimum unit of area of area coverage modulation. FIG. 11 shows a result of performing forward and backward scan printing without switching a three-dimensional LUT between forward scan printing and backward scan printing unlike the example described above. That is, FIG. 11 shows a result of performing forward and backward scan printing based on data that was subjected to color separation processing by the use of a single three-dimensional LUT. In the solid portion 1001, a color printed in a forward scan S1 is MC, or blue fairly close to magenta, and a color printed in a backward scan S2 is CM, or blue fairly close to cyan. On the other hand, in the fine-line portion 1002, a color printed in the forward scan S1 is mc, or blue slightly close to magenta, and a color printed in the backward scan S2 is cm, or blue slightly close to cyan. That is, even in the case of performing printing of the solid portion 1001 and the fine-line portion 1002 in the same manner, a color difference caused by forward and backward scan printing in the fine-line portion 1002 is smaller than that in the solid portion 1001. This difference is a reason why the fine-line portion 1002 is overcorrected and a color difference occurs in the fine-line portion 1002 in the case of applying the same color difference correction for forward and backward scan printing to the solid portion 1001 and the fine-line portion 1002.

There are two major factors causing a variation in a "color difference between forward and backward scans" between the fine-line portion and the solid portion: one is a physical difference in the number of printed dots influenced by area coverage modulation and the other is the characteristic of human visual perception. The factors are described below in detail.

[Influence of Area Coverage Modulation]

As described with reference to FIG. 2, the printing apparatus 100 finally performs printing based on 1-bit data indicating the presence and absence of dots. In this case, a gradation is represented by the number of dots in a certain unit of area for gradation reproduction. Accordingly, a minimum unit of area is necessary for gradation reproduction. A desired gradation cannot be realized in an image area having a size less than the minimum unit of area. In the case of a fine line or small object, a size may be less than the minimum unit of area. As a result, a color of a solid portion having a size greater than the minimum unit of area is different from a color of a fine line or small object having a size less than the minimum unit of area. In the case of reproducing 256 gradations by binary dithering, for example, gradation reproduction is realized by ON/OFF of dots in 16×16 pixels. Therefore, the minimum unit of area coverage modulation in this case is 16×16 pixels.

FIG. 12A to FIG. 12I are diagrams showing gradations in a solid portion and a fine-line portion in the minimum unit of area coverage modulation. Although the minimum unit of area coverage modulation is 16×16 pixels in the example described above, FIG. 12A to FIG. 12I show 6×6 pixels as the minimum unit for the sake of simplifying description.

Figures 12A, 12B, 12C, 12D, 12E, 12F, 12G, 12H, 12I:
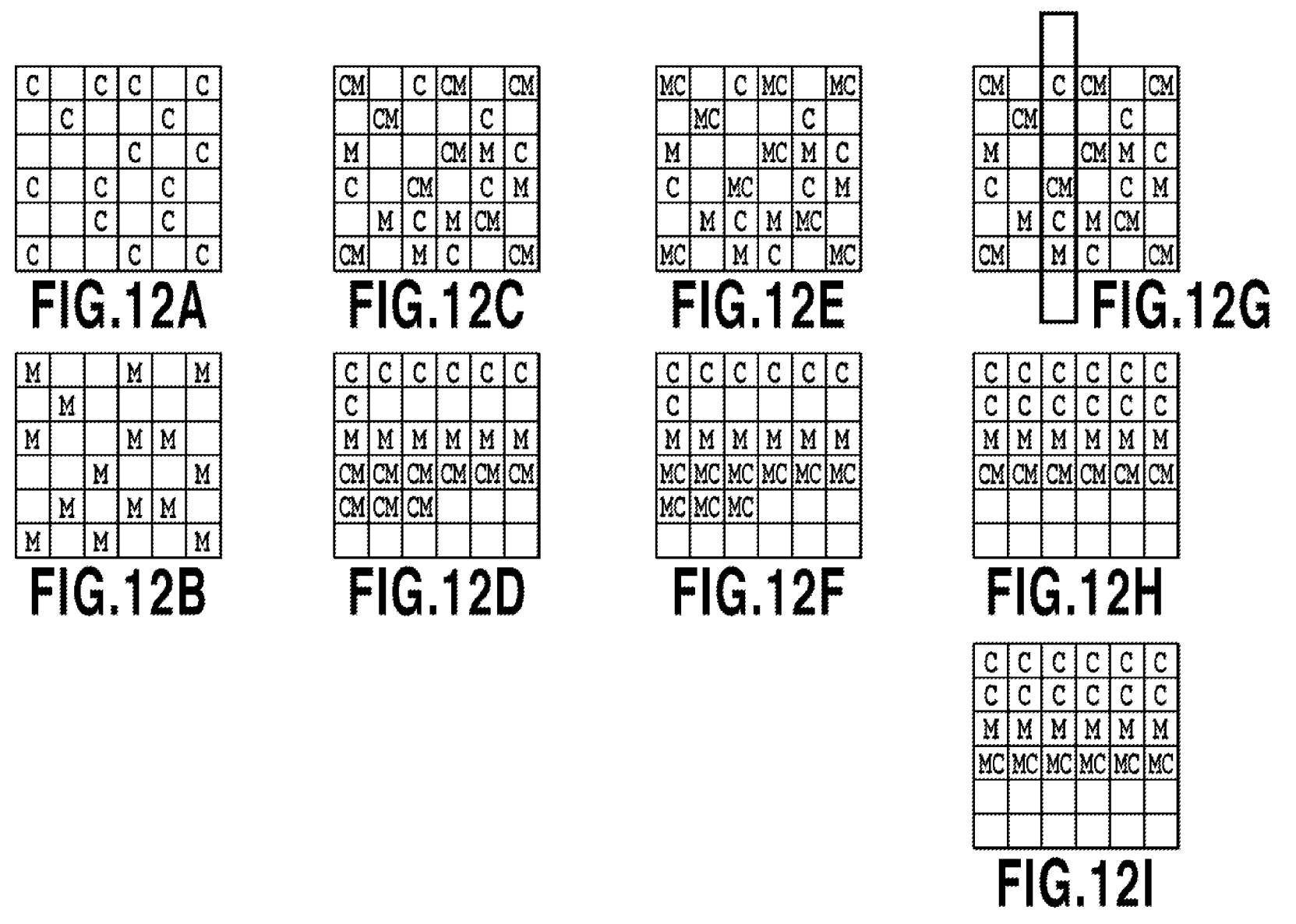

FIG. 12A shows a dither pattern for cyan and FIG. 12B shows a dither pattern for magenta. It is assumed here that a solid blue portion in the minimum unit having a cyan-magenta ratio of 1:1 is formed by printing cyan and magenta dots so that they overlap one another. FIG. 12C shows the arrangement of dots formed by forward scan printing of a blue portion in the minimum unit of area coverage modulation. In FIG. 12A to FIG. 12I, C denotes a pixel in which a cyan dot is formed and M denotes a pixel in which a magenta dot is formed. Similarly, CM denotes an overlapping dot, or a pixel of blue fairly close to cyan formed by printing a subsequent magenta dot on a previous cyan dot. MC denotes a pixel of blue fairly close to magenta formed by printing a subsequent cyan dot on a previous magenta dot. FIG. 12E shows the arrangement of dots formed by backward scan printing corresponding to FIG. 12C. FIG. 12E is different from FIG. 12C in that CM dots are replaced with MC dots.

FIG. 12G shows that a vertical one-pixel-wide blue line (fine line) is printed by the use of the patterns shown in FIG. 12A and FIG. 12B. FIG. 12G shows the arrangement of dots in forward scan printing. In FIG. 12G, the one-pixel-wide line is formed in the third column from the left. Two C dots, one CM dot, and one M dot are printed in 1×6 area in the third column from the left. Although not shown, CM dots in FIG. 12G are replaced with MC dots in the arrangement of dots in backward scan printing.

Next, a color reproduced in the fine-line portion and a color reproduced in the solid portion are compared with each other. FIG. 12D shows the number of dots formed by forward scan printing of the solid portion. For convenience, dots printed in a similar way are aligned. As shown in FIG. 12D, the solid portion formed by forward scan printing includes seven C dots, six M dots, and nine CM dots. FIG. 12F similarly shows the number of dots formed by backward scan printing of the solid portion. As shown in FIG. 12F, the solid portion formed by backward scan printing includes seven C dots, six M dots, and nine MC dots.

For the sake of comparison between breakdowns of the numbers of dots, it is assumed that six one-pixel-wide lines are aligned in the fine-line portion to equalize the area of the fine-line portion to the area of the solid portion. FIG. 12H shows the number of dots formed by forward scan printing of the fine-line portion in the same manner as the solid portion. As shown in FIG. 12H, the fine-line portion formed by forward scan printing includes 12 C dots, six M dots, and six CM dots. FIG. 12I similarly shows the number of dots formed by backward scan printing of the fine-line portion. As shown in FIG. 12I, the fine-line portion formed by backward scan printing includes 12 C dots, six M dots, and six MC dots.

Incidentally, a color difference between forward and backward scans is caused by overlapping dots as described above. Therefore, the number of CM or MC dots can be regarded as an index of the color difference between forward and backward scans. A comparison between the numbers of CM or MC dots in the solid portion and the fine-line portion shows that the solid portion has nine CM or MC dots and the fine-line portion has six CM or MC dots, that is, the numbers are different from each other. This difference causes a variation in a color difference in forward and backward printing between the fine-line portion and the solid portion. Although the number of C dots and the number of M dots also differ between the solid portion and the fine-line portion, these numbers are uniform irrespective of whether forward scan printing or backward scan printing and their difference is therefore not a factor of a color difference in forward and backward printing. Further, although FIG. 12G shows that the fine-line portion is a vertical line in the third column from the left as an example, the number of overlapping dots differs even in the case of extracting another line and this difference causes a variation in a color difference in forward and backward printing between the fine-line portion and the solid portion.

In the above description, dithering is used as an example of area coverage modulation. However, a similar color difference (color unevenness) occurs in any type of area coverage modulation. Therefore, the situation described above also applies to other types of area coverage modulation processing such as error diffusion. Further, in the above description, the case of binary printing using ON and OFF of dots is shown as an example of area coverage modulation. However, a similar color difference (color unevenness) occurs in any type of area coverage modulation. Therefore, the situation described above also applies to the case of multilevel printing.

[Characteristic of Human Visual Perception]

Next, the characteristic of human visual perception is described. The characteristic of human visual perception is the other factor causing a person to see a solid portion and a fine-line portion differently. As the characteristic of human visual perception, it is known that the sensitivity for distinction varies according to spatial frequencies. The Barten model is a publicly-known model of a response of the contrast sensitivity to the spatial frequencies.

Figure 13:
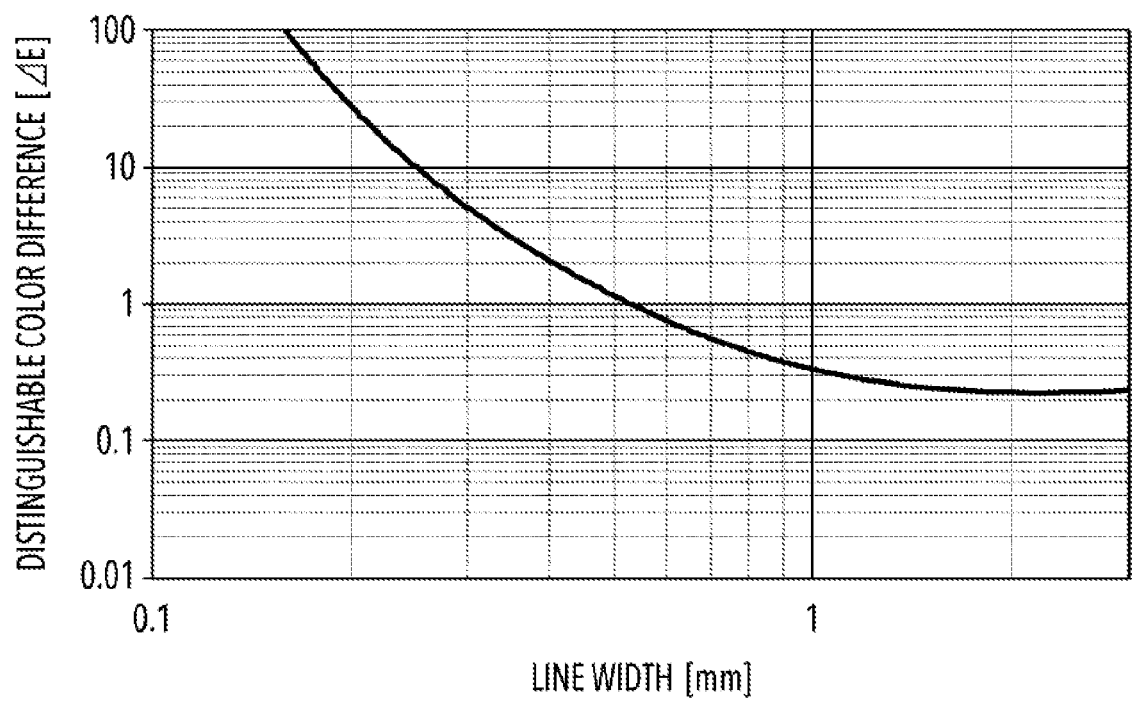
FIG. 13 is a graph showing a line width and a distinguishable color difference in the Barten model.

FIG. 13 is a graph showing a line width and a distinguishable color difference in the Barten model. More specifically, the graph shows a contrast ratio (=ΔL) which indicates the limit of distinction in a case where a one-dot-wide line and a one-dot-wide blank are repeated on the assumption that an observation distance is 30 cm. The graph is based on the presumption that the Barten model originally related to luminance ΔL can also be applied to a color difference ΔE. In FIG. 13, lines are recognized under the solid line and not recognized over the solid line. For example, in a case where a color difference ΔE of resulting color unevenness is 5.0, a maximum line width whereby a person can distinguish color unevenness is 0.3 mm. That is, in a case where a color difference ΔE of color unevenness resulting from forward and backward printing is less than 5.0, the color unevenness in a fine line is not recognized provided that the width of the fine line is 0.3 mm. Similarly, FIG. 13 shows that as the line width becomes narrower, the color unevenness is less prone to be recognized. As described above, in the case of a fine line, there may be a case where a color difference between forward scan printing and backward scan printing is not recognized due to the characteristic of human visual perception even though correction to suppress the color difference is not performed. However, if correction to suppress a color difference between forward scan printing and backward scan printing is performed and the color difference is overcorrected, there may be a case where the color difference is recognized.

<Processing to Switch Color Unevenness Correction in Forward and Backward Scan Printing Between Fine-Line Portion and Solid Portion>

In view of the situation described above, in the present embodiment, in the case of performing processing to correct colors (color unevenness) between forward scan printing and backward scan printing, processing to switch the correction of colors (color unevenness) between forward scan printing and backward scan printing is performed between a fine-line portion and a solid portion. In the following description, the processing to correct colors (color unevenness) between forward scan printing and backward scan printing is also referred to as forward and backward color unevenness correction.

[Overview]

In the present embodiment, the main control unit 101 determines whether an object to be processed is a fine-line portion or a solid portion based on PDL data. The main control unit 101 subjects a fine-line portion to forward and backward color unevenness correction processing (CS: color shading) for a fine-line portion and subjects a non-fine-line portion to forward and backward color unevenness correction processing (CS) for a solid portion, which is different from the processing for a fine-line portion. That is, the main control unit 101 performs processing to switch a control parameter set for color unevenness correction depending on an object to be processed. In an example described below, the control parameter is a table set of three-dimensional LUTs used in the postprocessing J05 (color separation processing).

In the present embodiment, a table set for a fine-line portion and a table set for a solid portion are prepared. The table set is a set including a conversion table (three-dimensional LUT) for forward scan printing and a conversion table (three-dimensional LUT) for backward scan printing. A table set to be used is switched and set depending on whether image data indicates a fine-line object or a solid object. Then, based on whether a pixel group (band) to be subjected to color processing (color conversion processing/color separation processing) should be printed in a forward scan or a backward scan, the color processing is performed by the use of a corresponding conversion table included in the selected table set. The conversion tables included in the table sets of the present embodiment are three-dimensional LUTs used in the postprocessing J05 (color separation processing).

[Flowchart]

Figure 14:
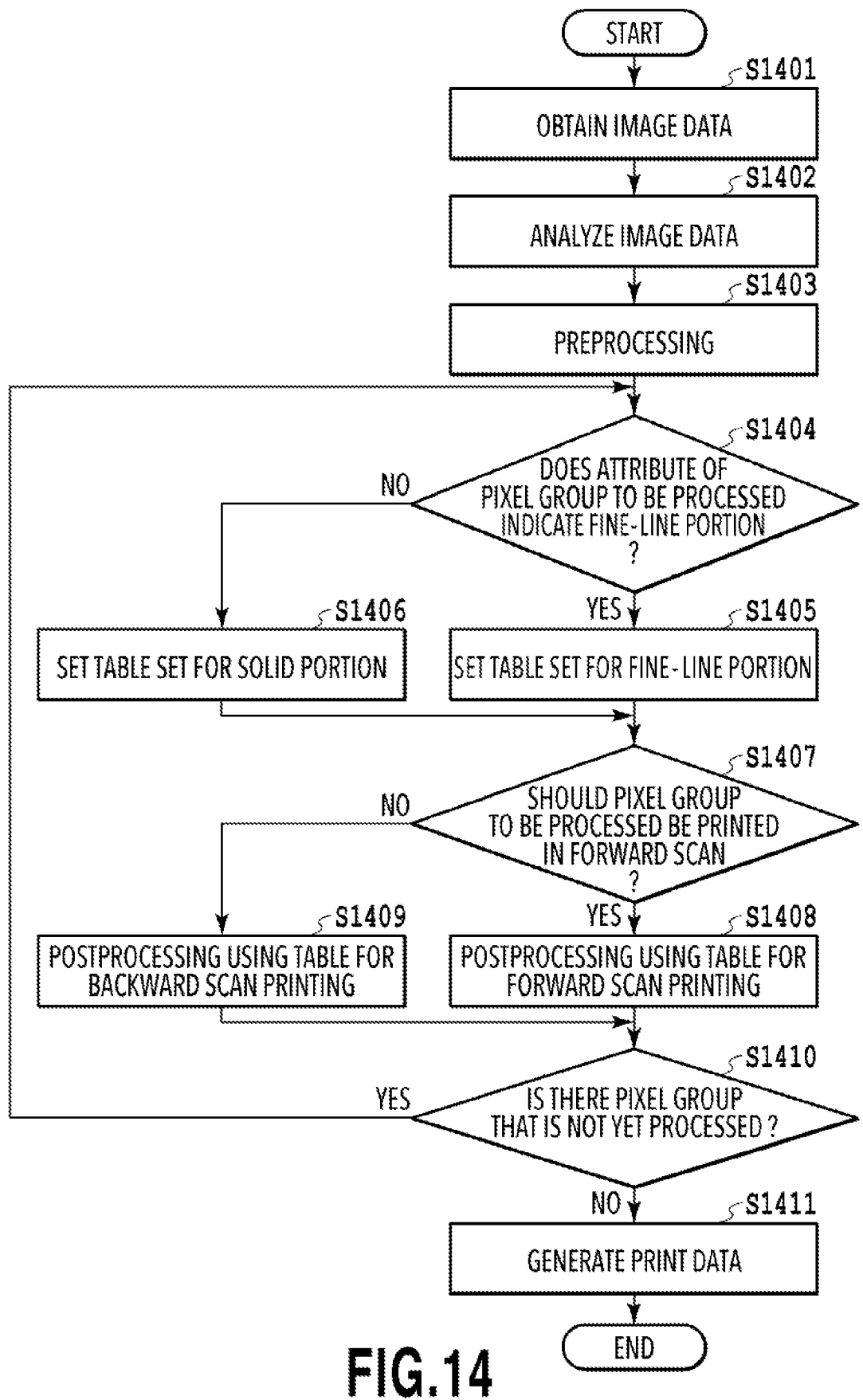
FIG. 14 is a flowchart shown as an example.

FIG. 14 shows an example of a flowchart including the processing to switch the table sets of the present embodiment. The processing shown in FIG. 14 is realized by a CPU, MPU and the like included in the main control unit 101 (image processing unit) of the printing apparatus 100 performing the processing based on programs stored in an RAM, ROM and the like included in the main control unit 101.

FIG. 15A to FIG. 15E show the switching of the table sets. FIG. 15A to FIG. 15E show patterns of switching various control parameters. In the present embodiment, an example of a switching pattern shown in FIG. 15A is described. The other patterns shown in FIG. 15B to FIG. 15E will be described later in the other embodiments.

In step S1401, the main control unit 101 obtains image data indicating an input image. In this example, the main control unit 101 obtains PDL image data transmitted from the printer driver of the host device 200.

In step S1402, the main control unit 101 analyzes the image data obtained in step S1401. This step corresponds to the image data analysis processing J03 shown in FIG. 2. In step S1402, raster image data is generated. Further, attribute information on each pixel is obtained from rendering commands included in PDL data. In the present embodiment, the main control unit 101 obtains an attribute indicating whether an object is a fine-line portion or a solid portion. To be more specific, the main control unit 101 obtains attribute information which defines an attribute of a pixel group described by vector rendering commands in FIG. 4 as a fine-line portion and defines an attribute of a pixel group described by bitmap rendering commands as a solid portion.

In step S1403, the main control unit 101 performs the preprocessing J04, that is, performs processing to convert sRGB raster image data into device-specific RGB image data.

In step S1404, the main control unit 101 determines whether an attribute of a pixel group to be processed indicates a fine line. In the present embodiment, the main control unit 101 performs the postprocessing J05 for each predetermined pixel group (for example, for each band). The determination of whether the attribute indicates a fine line is based on the attribute information obtained in the image data analysis processing J03 in step S1402.

If the main control unit 101 determines that the attribute of the pixel group to be processed indicates a fine line, the main control unit 101 proceeds to step S1405 and sets a table set A for a fine-line portion. If the main control unit 101 determines that the attribute of the pixel group to be processed does not indicate a fine line, the main control unit 101 proceeds to step S1406 and sets a table set B for a solid portion (see FIG. 15A).

In step S1407, the main control unit 101 determines whether the pixel group to be processed is to be printed in a forward scan. For example, the main control unit 101 can determine whether the pixel group to be processed is to be printed in a forward scan or a backward scan based on a print size and a nozzle width. It should be noted that the determination of whether the pixel group is to be printed by a forward scan may be appropriately made depending on a printing method.

If the pixel group is to be printed in a forward scan, the main control unit 101 proceeds to step S1408 and performs the postprocessing J05 using a table for forward scan printing included in the table set selected in step S1405 or step S1406. If the pixel group is not to be printed in a forward scan, the main control unit 101 proceeds to step S1409 and performs the postprocessing J05 using a table for backward scan printing included in the table set selected in step S1405 or step S1406.

In step S1410, the main control unit 101 determines whether there is a pixel group that is not yet processed. If there is a pixel group that is not yet processed, the main control unit 101 returns to step S1404 and repeats the above processing for the pixel group that is not yet processed. If there is no pixel group that is not yet processed, the main control unit 101 proceeds to step S1411.

In step S1411, the main control unit 101 performs various kinds of processing following the postprocessing J05 to generate print data.

[Method of Generating Table Sets]

Next, a method of generating a conversion table used in the table sets described above is described. A method of generating the table set B for a solid portion is described first.

Figure 16:
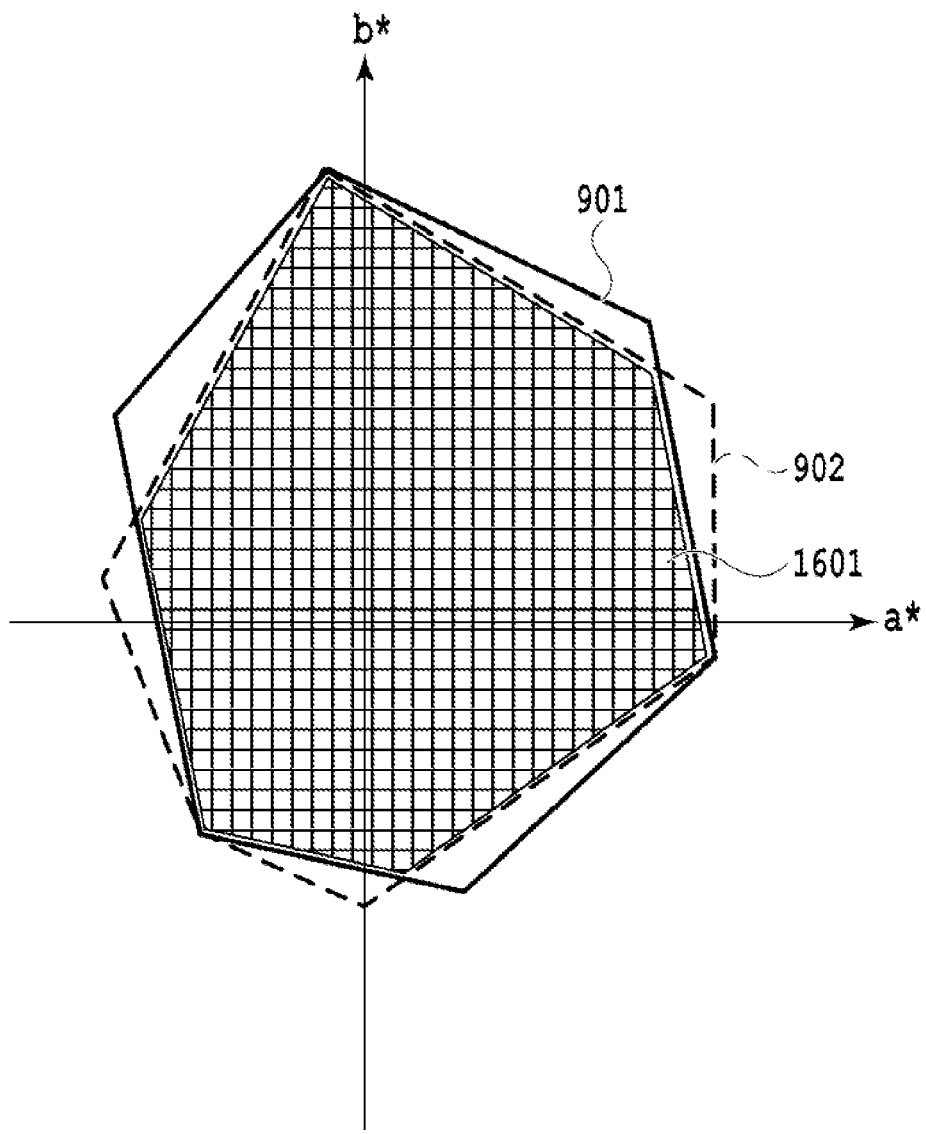
FIG. 16 is a diagram showing color gamuts.
Figure 17:
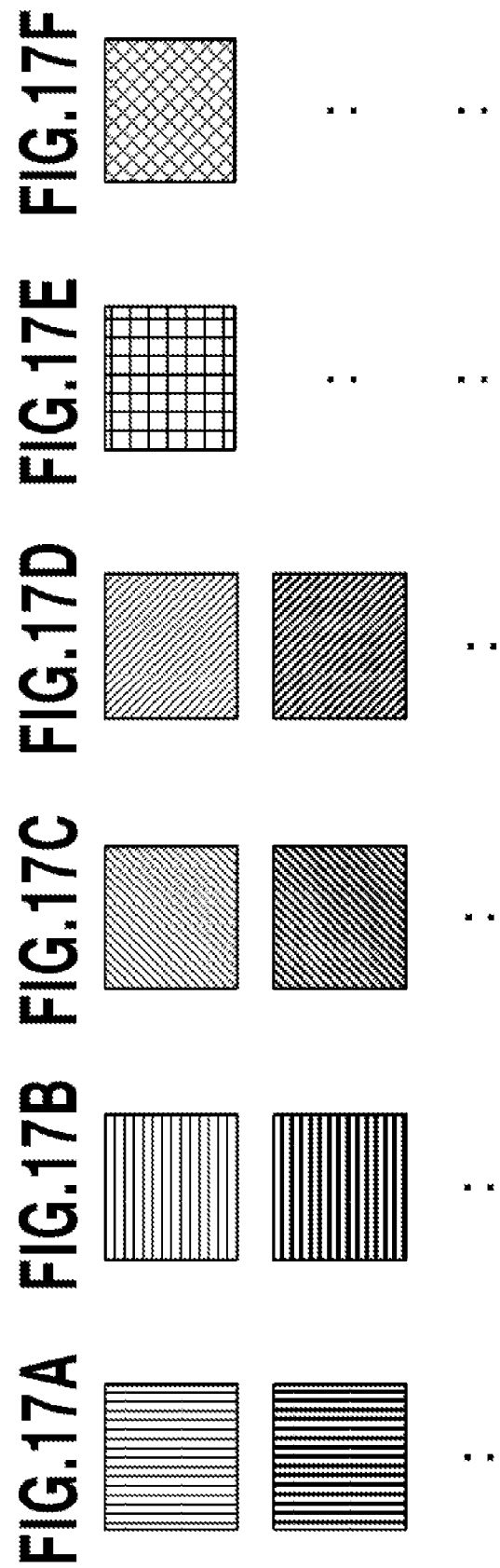
FIG. 17A to FIG. 17F are diagrams showing an example of patches.

FIG. 16 is a diagram showing color gamuts in forward scan printing and backward scan printing in the case of a solid portion. As shown in FIG. 16, a color gamut 901 in forward scan printing is different from a color gamut 902 in backward scan printing. In order to reduce a color difference (color unevenness) in forward and backward scan printing, it is desired that the same color is reproduced by both of forward scan printing and backward scan printing. Accordingly, it is preferable that color reproduction is performed in a common color gamut 1601 that can be reproduced in both the forward and backward directions. The color gamut 1601 can be obtained by preparing 9×9×9 solid patches by varying each of R, G, and B from 0 to 255, for example, in units of 32 values, printing the patches in each of a forward scan and a backward scan, and measuring the printed colors. It should be noted that a publicly-known color matching technique can be used to obtain the common color gamut from each color gamut. The publicly-known color matching technique can also be used to obtain two tables, a table for forward scan printing and a table for backward scan printing, for a solid portion in which the common color gamut is reproduced. The tables can be stored as the table set B in a RAM or the like.

FIG. 17A to FIG. 17F are diagrams showing an example of patches used to generate tables for a fine-line portion. In order to generate tables for a fine-line portion, measurements should be taken by the use of fine lines. In this case, for example, a color gamut can be obtained by preparing and measuring hatching patches including fine lines as shown in FIG. 17A to FIG. 17D. A vertical hatch shown in FIG. 17A may be used in a case where a number of vertical lines are expected. In a case where various lines are included, for example, all patterns shown in FIG. 17A to FIG. 17D may be measured and averaged. Alternatively, a measuring instrument that measures a color of a minute, micron-sized object may be used to directly measure a color of a fine line.

In the present embodiment, the table set A for a fine-line portion and the table set B for a solid portion are prepared. However, the table set A for a fine-line portion should not necessarily be prepared. It is understood from the characteristic of visual perception in the Barten model in FIG. 13 that color unevenness tends to be inconspicuous in a fine line. Therefore, it is not necessary to perform forward and backward color unevenness correction for a fine-line portion. That is, there is no need to generate the table set A for a fine-line portion used for the forward and backward color unevenness correction. It is only necessary to perform color separation processing by the use of a conversion table used for normal color separation processing without consideration of the forward and backward color unevenness correction. Alternatively, either a table for forward scan printing or a table for backward scan printing included in the table set B for a solid portion may be used for both forward scan printing and backward scan printing. For a fine-line portion, correction to weaken the forward and backward color unevenness correction may be performed. For example, median values of values in a forward scan table for a solid portion and values in a backward scan table for a solid portion may be applied to a fine-line portion. This increases the processing speed of a fine-line portion and enables simplification and speedup of image processing.

As described above, according to the present embodiment, a table set used for forward and backward color unevenness correction processing is switched between a solid portion and a fine-line portion, thereby reducing color unevenness in both the solid portion and the fine-line portion.

Embodiment 2

In embodiment 1, a table set is switched depending on whether a fine-line portion or a solid portion. In the present embodiment, a table set corresponding to a hatched portion is further prepared.

In the following description, the same features as those of embodiment 1 are represented by the same reference numerals and their detailed description is omitted. In the present embodiment, hatching items are taken into consideration as shown in FIG. 15B.

In a hatched area, as shown in FIG. 17A to FIG. 17F, a reproduced color often varies according to a pattern such as a vertical, horizontal, diagonal or cross pattern, the density of lines and the like as well as a line width. Accordingly, a color difference in forward and backward printing may also vary. In the present embodiment, a table set C for hatching is further prepared and a table set to be used is switched based on attributes.

Figure 18:
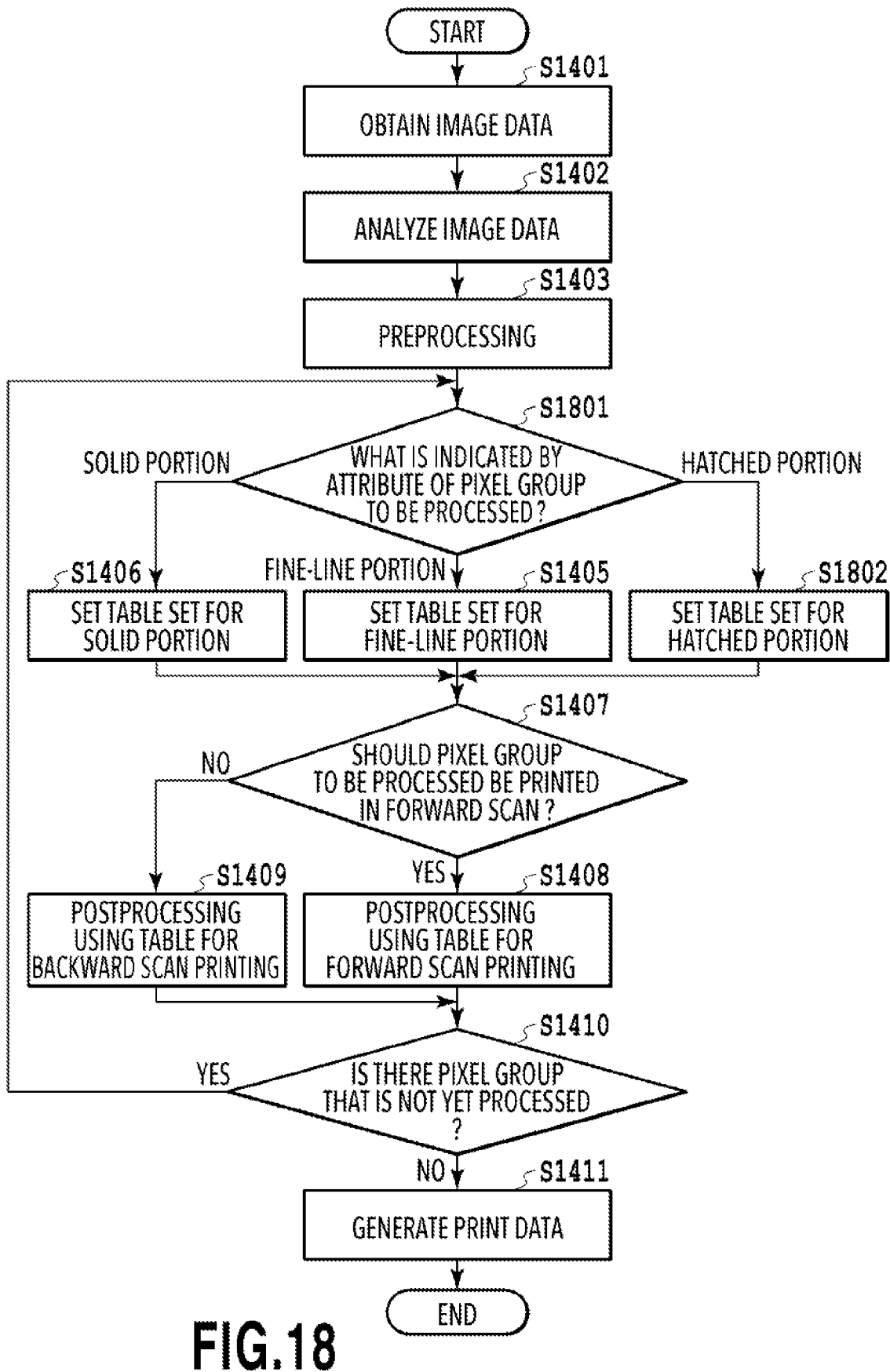
FIG. 18 is a flowchart shown as an example.

FIG. 18 shows an example of a flowchart in the present embodiment. The same steps as those shown in FIG. 14 are represented by the same reference numerals and their description is omitted. In the present embodiment, attribute information obtained as a result of the image data analysis processing in step S1402 is classified into a fine-line portion, a solid portion, and a hatched portion. That is, out of the vector rendering commands shown in FIG. 4, hatching rendering commands are provided with an attribute of a hatched portion.

In step S1801, the main control unit 101 determines an attribute of a pixel group to be processed. The main control unit 101 proceeds to step S1405 if the attribute is determined to indicate a fine-line portion and proceeds to step S1406 if the attribute is determined to indicate a solid portion. If the attribute is determined to indicate a hatched portion, the main control unit 101 proceeds to step S1802 and sets the table set C for a hatched portion. The subsequent steps are the same as those described in embodiment 1.

As described above, objects are classified finely and then processed, whereby color unevenness can be reduced more accurately in a hatched portion.

Embodiment 3

In embodiment 1, a table set for a fine-line portion is uniformly treated without consideration of a numerical value of a line width. In the present embodiment, table sets are used in a phased manner in consideration of a line width.

In the following description, the same features as those of embodiment 1 are represented by the same reference numerals and their detailed description is omitted. In the present embodiment, items regarding a line width are taken into consideration as shown in FIG. 15C. In the present embodiment, widths less than 16 pixels, the minimum unit of area coverage modulation, are classified per pixel and correction is performed in a phased manner for each width. For example, in a case where a line width is one pixel, an object is treated as a fine-line portion and the table set A for a fine-line portion is used as described in embodiment 1. In a case where the line width is from 2 to 15 pixels, the table set A for a fine-line portion and the table set B for a solid portion are used in a phased manner. In a case where the line width is 16 pixels or more, the table set B for a solid portion is used. For example, in a case where the line width is two pixels, a table value used for the postprocessing is obtained by the following formula: (table set A)×(16−2)/16+(table set B)×2/16.

Figure 19:
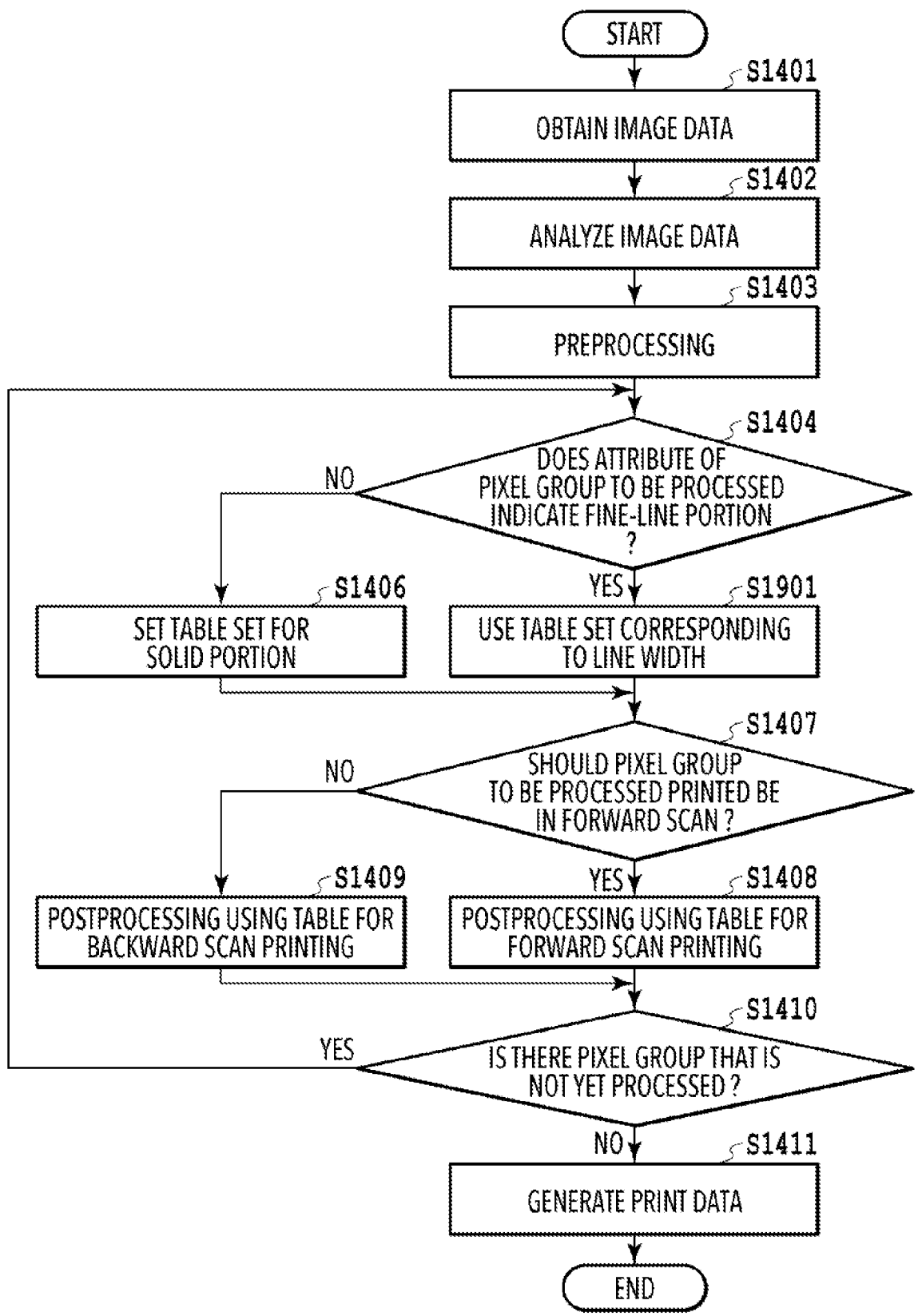
FIG. 19 is a flowchart shown as an example.

FIG. 19 shows an example of a flowchart in the present embodiment. The same steps as those shown in FIG. 14 are represented by the same reference numerals and their description is omitted. In the present embodiment, the attribute information obtained as a result of the image data analysis processing in step S1402 includes information about a line width. In the present embodiment, if the attribute is determined to indicate a fine-line portion in step S1404, the main control unit 101 proceeds to step S1901 and uses a table set(s) corresponding to a line width as described above. The subsequent steps are the same as those described in embodiment 1.

As described above, color unevenness can be suitably reduced based on a line width in the present embodiment.

Embodiment 4

In the above embodiments, PDL image data is analyzed and a table set is switched based on attributes corresponding to rendering commands as an example. In the present embodiment, a table set is switched based on a value set in a UI screen of the printer driver. In the present embodiment, information obtained via a UI of the printer driver is used as "information obtained for fine line determination" as shown in FIG. 15D.

Figure 20A:
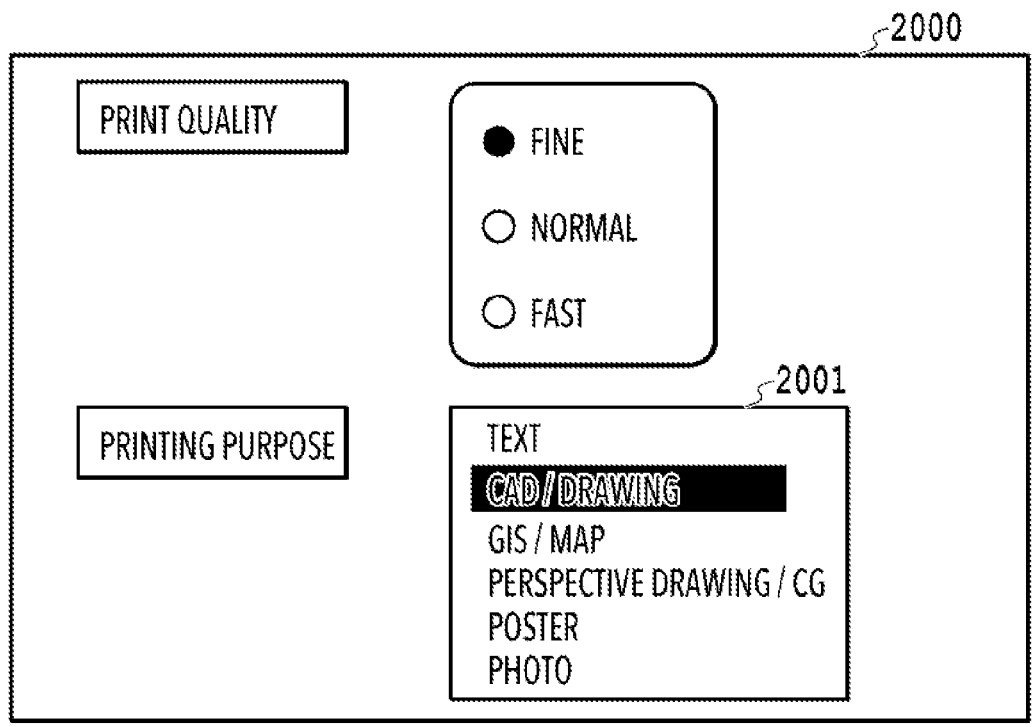
FIG. 20A and FIG. 20B are diagrams showing an example of UIs of a printer driver.
Figure 20B:
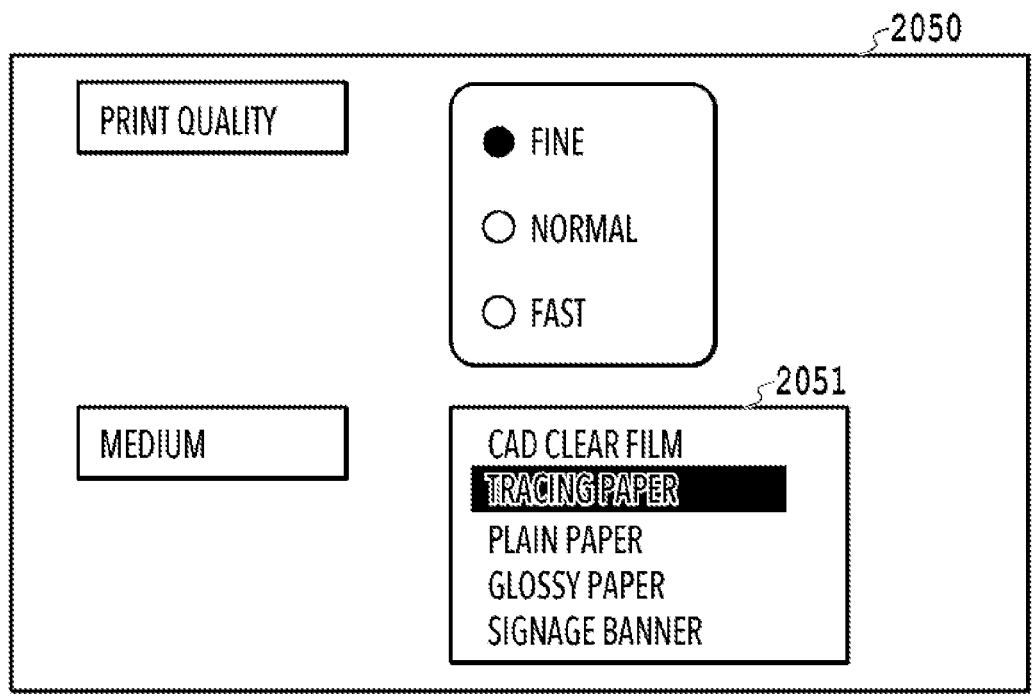

FIG. 20A and FIG. 20B are diagrams showing an example of a UI 2000 of the printer driver. In FIG. 20A, a printing purpose 2001 is selectable. FIG. 20A shows a state where "CAD/drawing" is selected. In a case where the printing purpose is "CAD/drawing," it is assumed that a number of fine lines are used. Accordingly, the main control unit 101 sets the table set A for a fine-line portion to perform forward and backward color unevenness correction processing. Similarly, since it is assumed that a number of fine lines are used also in a case where the printing purpose is "text" or "GIS/map," the main control unit 101 performs the processing for a fine line.

In contrast, in a case where the printing purpose is "perspective drawing/CG," "poster," or "photo," it is not assumed that fine lines are mainly used. Accordingly, the main control unit 101 sets the table set B for a solid portion in the case of "perspective drawing/CG," "poster," or "photo" to perform forward and backward color unevenness correction processing.

Further, as shown in FIG. 20B, a print medium ("medium") 2051 to be used is selectable in a UI 2050 of the printer driver. In a case where the print medium is "CAD clear film," "tracing paper," or "plain paper," it is assumed that the printing purpose is a CAD drawing or text. Accordingly, the main control unit 101 sets the table set A for a fine-line portion to perform forward and backward color unevenness correction processing. In a case where the print medium is "glossy paper," "signage banner" or the like, that is, it is assumed that the purpose is a photograph, poster or the like and fine lines are not mainly used, the main control unit 101 sets the table set B for a solid portion to perform forward and backward color unevenness correction processing.

As described above, in the present embodiment, a table set to be used is set for an image as a whole without switching a table set depending on an object included in the image unlike embodiments 1 to 3. The determination can easily be made by making selections in UIs of the printer driver, whereby an image can be processed at high speed without the need to refer to the attribute of the image.

Other Embodiments

In the embodiments described above, a conversion table used for color separation processing to convert data represented by RGB into data represented by CMYK corresponding to ink to be used is taken as an example of a conversion table to be switched depending on the scan direction. However, a conversion table to be switched depending on the scan direction is not limited to this type of conversion table. It may be any conversion table provided that it is at least one of conversion tables used in the image processing as shown in FIG. 2. For example, a conversion table used in the preprocessing J04 may be switched. That is, a control parameter may be a conversion table used in the preprocessing J04.

Further, in the embodiments described above, in order to reduce color unevenness in forward and backward scan printing, a conversion table capable of changing colors of pixels to be printed (at least one of hue, lightness, and chroma) is used as an example. However, processing to reduce color unevenness in forward and backward scan printing is not limited to a change of a conversion table. In order to reduce color unevenness in forward and backward scan printing, it is only necessary to change colors of pixels to be printed (at least one of hue, lightness, and chroma). A halftoning method or a dot arrangement method in a dot arrangement pattern may be changed to change colors of pixels to be printed (at least one of hue, lightness, and chroma). Accordingly, changing a halftoning method or a dot arrangement method in a dot arrangement pattern based on an attribute of a pixel group to be processed and a scan direction in which the pixel group is printed is also effective. For example, in the case of a solid portion, since clustered dots often cause color unevenness, the arrangement of dots is only required to be of a dispersed-dot type. On the other hand, in the case of a fine-line portion, the arrangement of dots may be of either a dispersed-dot type or a clustered-dot type. In short, a control parameter may be a halftoning method or a dot arrangement pattern used in the halftoning processing J07.

Further, in the embodiments described above, four types of ink CMYK are used. However, it is needless to say that the types of ink to be used are not limited to this example. For instance, six types of ink including light cyan (LC) and light magenta (LM) in addition to the four types CMYK may be used. In this case, a conversion table used in the postprocessing converts data represented by RGB into color separation data corresponding to the six types of ink.

Further, in the embodiments described above, various types of image processing J03 to J08 are performed in the printing apparatus 100 as described with reference to FIG. 2. However, the image processing may be performed by either the host device 200 or the printing apparatus 100. For example, in a case where the host device 200 performs the application processing J01 to the postprocessing J05 and the printing apparatus 100 performs the gamma correction processing J06 to the driving processing J09, the host device 200 performs processing to switch a conversion table to be used in the postprocessing J05 depending on the scan direction.

Further, in the embodiments described above, a control parameter for a fine-line portion (a conversion table set for forward and backward scans) and a control parameter for a solid portion (a conversion table set for forward and backward scans) are prepared. However, control parameters for a fine-line portion and control parameters for a solid portion may be prepared according to available presets such that the parameters can be appropriately changed and used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-095880, filed May 12, 2017, which is hereby incorporated by reference wherein in its entirety.

What is claimed is:

1. An image processing apparatus comprising:
one or more processors; and
one or more computer-readable storage media coupled to the one or more processors, the one or more computer-readable storage media storing instructions that, when executed by the one or more processors, cause the one or more processors to perform operations for processing image data used for printing by a printing apparatus configured to perform forward and backward scan printing by using a print head in which nozzle arrays corresponding to multiple colors are aligned, the operations comprising:
setting a first control parameter when image data to be processed does not include a line portion and setting a second control parameter when the image data to be processed includes a line portion, the second control parameter being different from the first control parameter; and
processing the image data for suppressing a difference between a color printed in a forward scan and a color printed in a backward scan based on the set control parameter, wherein
the color difference suppressed in the processing operation based on the second control parameter is smaller than a color difference suppressed in the processing operation based on the first control parameter.

2. The image processing apparatus according to claim 1, wherein the image data to be processed is data indicating predetermined image areas included in an input image, and
the setting operation sets the first control parameter or the second control parameter for each of the predetermined image areas included in the input image.

3. The image processing apparatus according to claim 2, wherein the input image is an image obtained through an analysis of data in a PDL format, and
the setting operation specifies an image area including the line portion and an image area not including the line portion based on a rendering command obtained through the analysis of the data in the PDL format.

4. The image processing apparatus according to claim 3, wherein the setting operation specifies that an image area includes the line portion when the rendering command is a vector rendering command.

5. The image processing apparatus according to claim 3, wherein the setting operation specifies that an image area does not include the line portion when the rendering command is a bitmap rendering command.

6. The image processing apparatus according to claim 2, wherein for an image area including a hatched portion, the setting operation sets a third control parameter, the third parameter being different from the first control parameter or the second control parameter.

7. The image processing apparatus according to claim 2, wherein an image area including the line portion is an area having a size less than a unit of area of area coverage modulation.

8. The image processing apparatus according to claim 2, wherein in the processing operation the first control parameter and the second control parameter are applied in a phased manner depending on the width of the line portion.

9. The image processing apparatus according to claim 2, wherein the setting operation specifies whether an input image is an image including a line portion or an image not including the line portion based on an item selected in a UI screen of a printer driver, and
setting operation sets an identical control parameter for the image data to be processed which forms the input image.

10. The image processing apparatus according to claim 1, wherein each of the first control parameter and the second control parameter is a set of conversion tables used for color separation processing, and
the processing operation is performed in the color separation processing.

11. The image processing apparatus according to claim 10, wherein the set of conversion tables includes a table used for color separation processing of a pixel to be printed in the forward scan and a table used for color separation processing of a pixel to be printed in the backward scan.

12. The image processing apparatus according to claim 1, wherein each of the first control parameter and the second control parameter is a set of conversion tables used for color conversion processing, and
the processing operation is performed in the color conversion processing.

13. The image processing apparatus according to claim 12, wherein the set of conversion tables includes a table used for color conversion processing of a pixel to be printed in the forward scan and a table used for color conversion processing of a pixel to be printed in the backward scan.

14. The image processing apparatus according to claim 1, wherein each of the first control parameter and the second control parameter is a halftoning method or a dot arrangement pattern used in halftoning processing, and
the processing operation is performed in the halftoning processing.

15. The image processing apparatus according to claim 1, wherein the processing operation does not suppress the difference when the second control parameter is set.

16. The image processing apparatus according to claim 13, wherein in the first control parameter, a conversion table for printing in a forward scan is different from a conversion table for printing in a backward scan, and
in the second control parameter, a conversion table for printing in a forward scan is identical to a conversion table for printing in a backward scan.

17. An image processing method for processing image data used for printing by a printing apparatus configured to perform forward and backward scan printing by using a print head in which nozzle arrays corresponding to multiple colors are aligned, the image processing method comprising:
setting a first control parameter when image data to be processed does not include a line portion and setting a second control parameter when the image data to be processed includes a line portion, the second control parameter being different from the first control parameter; and
processing the image data to suppress a difference between a color printed in a forward scan and a color printed in a backward scan based on the set control parameter, wherein
a color difference suppressed in processing performed based on the second control parameter is smaller than a color difference suppressed in processing performed based on the first control parameter.

18. A non-transitory computer readable storage medium storing a program which causes a computer to perform an image processing method,
the image processing method being an image processing method for processing image data used for printing by a printing apparatus configured to perform forward and backward scan printing by using a print head in which nozzle arrays corresponding to multiple colors are aligned, the image processing method comprising:
setting a first control parameter when image data to be processed does not include a line portion and setting a second control parameter when the image data to be processed includes a line portion, the second control parameter being different from the first control parameter; and
performing, for the image data to be processed, processing to suppress a difference between a color printed in a forward scan and a color printed in a backward scan based on the set control parameter, wherein
a color difference suppressed in processing performed based on the second control parameter is smaller than a color difference suppressed in processing performed based on the first control parameter.

19. An image processing apparatus comprising:
one or more processors; and
one or more computer-readable storage media coupled to the one or more processors, the one or more computer-readable storage media storing instructions that, when executed by the one or more processors, cause the one or more processors to perform operations for processing image data used for printing by a printing apparatus configured to perform forward and backward scan printing by using a print head in which nozzle arrays corresponding to multiple colors are aligned, the operations comprising:
setting a first control parameter when image data to be processed does not include a line portion and setting a second control parameter when the image data to be processed includes a line portion, the second control parameter being different from the first control parameter; and
performing a predetermined process of the image data for suppressing a difference between a color printed in a forward scan and a color printed in a backward scan based on the first control parameter in a case where the first control parameter is set and not perform the predetermined process of the difference between a color printed in a forward scan and a color printed in a backward scan based on the second control parameter in a case where the second control parameter is set.

20. An image processing apparatus comprising:
one or more processors; and
one or more computer-readable storage media coupled to the one or more processors, the one or more computer-readable storage media storing instructions that, when executed by the one or more processors, cause the one or more processors to perform operations for processing image data used for printing by a printing apparatus configured to perform forward and backward scan printing by using a print head in which nozzle arrays corresponding to multiple colors are aligned, the operations comprising:
performing a color separation processing for converting input image data representing color of image into ink data corresponding to ink color combinations for reproducing colors of the image by the print head using a first conversion table defining a value of the output ink data according to a value of the input image data for the forward scan printing and a second conversion table defining a value of the output ink data according to a value of the input image data in different manner from the first conversion table for the backward scan printing when image data to be processed does not include a line portion, and performing the color separation processing converting input image data representing color of image into ink data corresponding to ink color combinations for reproducing colors of the image by the print head using a same conversion table defining a value of the output ink data according to a value of the input image data for both the forward scan printing and the backward scan printing when the image data to be processed include a line portion.

* * * * *